United States Patent
Romano

(10) Patent No.: US 10,390,203 B2
(45) Date of Patent: Aug. 20, 2019

(54) MULTIMEDIA CENTRIC ADAPTIVE EMERGENCY RESPONSE MESSAGING APPARATUS AND METHOD

(71) Applicant: Michael Romano, Lake Mary, FL (US)

(72) Inventor: Michael Romano, Lake Mary, FL (US)

( * ) Notice: Subject to any disclaimer, the term of this patent is extended or adjusted under 35 U.S.C. 154(b) by 0 days.

(21) Appl. No.: 16/119,761

(22) Filed: Aug. 31, 2018

(65) Prior Publication Data
US 2019/0020992 A1    Jan. 17, 2019

Related U.S. Application Data

(63) Continuation-in-part of application No. 15/586,474, filed on May 4, 2017, now abandoned.

(60) Provisional application No. 62/331,940, filed on May 4, 2016.

(51) Int. Cl.
| | | |
|---|---|---|
| *H04W 4/90* | (2018.01) | |
| *H04W 4/14* | (2009.01) | |
| *H04W 4/02* | (2018.01) | |
| *H04M 1/725* | (2006.01) | |
| *H04M 11/04* | (2006.01) | |
| *H04W 76/50* | (2018.01) | |

(52) U.S. Cl.
CPC ......... *H04W 4/90* (2018.02); *H04M 1/72538* (2013.01); *H04M 11/045* (2013.01); *H04W 4/025* (2013.01); *H04W 4/14* (2013.01); *H04W 76/50* (2018.02); *H04M 2242/04* (2013.01)

(58) Field of Classification Search
CPC ......... H04W 4/90; H04W 4/14; H04W 4/025; H04W 76/50; H04M 1/72538; H04M 11/045; H04M 2242/04
See application file for complete search history.

(56) References Cited

U.S. PATENT DOCUMENTS

| | | | | |
|---|---|---|---|---|
| 2006/0262907 | A1* | 11/2006 | Diroo | H04Q 3/0079 379/45 |
| 2009/0143045 | A1* | 6/2009 | Graves | A61B 5/02055 455/404.1 |
| 2010/0075628 | A1* | 3/2010 | Ye | H04W 4/90 455/404.2 |
| 2012/0149324 | A1* | 6/2012 | Daly | H04W 4/90 455/404.1 |
| 2013/0077766 | A1* | 3/2013 | Keller | H04M 3/42365 379/45 |
| 2013/0171957 | A1* | 7/2013 | Sennett | H04W 4/12 455/404.1 |
| 2014/0206308 | A1* | 7/2014 | Hatton | H04W 4/90 455/404.2 |
| 2014/0368601 | A1* | 12/2014 | deCharms | H04W 4/021 348/14.02 |
| 2016/0087942 | A1* | 3/2016 | Yaguchi | H04L 63/08 726/4 |
| 2016/0088463 | A1* | 3/2016 | Stanke | H04W 8/18 455/404.1 |

(Continued)

*Primary Examiner* — Mehmood B. Khan
(74) *Attorney, Agent, or Firm* — Paul Royal, Jr.; The Patent Guild

(57) ABSTRACT

Present is a multimedia centric adaptive emergency response messaging apparatus and method disclosed herein via an emergency response communications method for exchanging information about an emergency situation, the method being executed by at least one network connected computer system having a processor and machine readable memory.

13 Claims, 31 Drawing Sheets

(56) References Cited

U.S. PATENT DOCUMENTS

| | | | |
|---|---|---|---|
| 2016/0132981 A1* | 5/2016 | Cherry | G06Q 50/265 705/325 |
| 2016/0255483 A1* | 9/2016 | Parlamas | H04W 4/90 455/404.2 |
| 2016/0373440 A1* | 12/2016 | Mather | H04L 63/0861 |

* cited by examiner

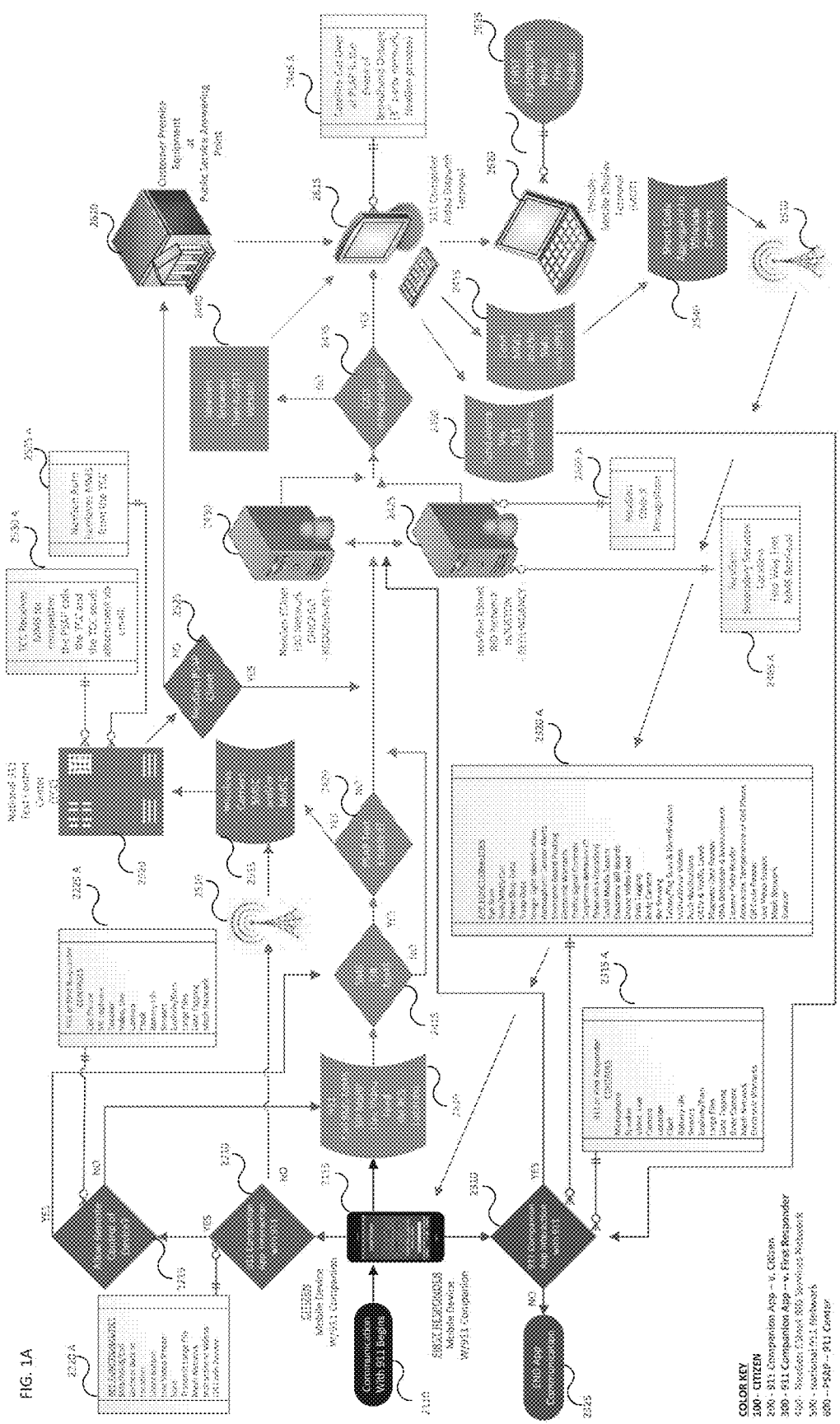

MULTIMEDIA CENTRIC ADAPTIVE EMERGENCY RESPONSE MESSAGING APPARATUS AND METHOD

CROSS-REFERENCE TO RELATED APPLICATIONS

This application is a continuation-in-part of U.S. application Ser. No. 15/586,474, filed May 4, 2017, which claims the benefit of U.S. Provisional Application No. 62/331,940, filed May 4, 2016.

FIELD OF THE APPARATUS AND METHOD

The invention relates to the field of emergency response communications and, more particularly to systems and methods for dynamic distribution of multimedia and data files across an emergency response communications network and remote Citizen device control by First Responders.

BACKGROUND OF THE INVENTION

In 1968 when 911 first went live in Alabama, the infrastructure was developed and initially evolved as a "phone only" system. Based on a phone system infrastructure, the 911 system was developed around what is called a PBX (Public Branch Exchange.) A PBX is a phone system designed to share lines and route calls. During the deployment of 911, a PBX was the perfect, and most advanced technology to utilize at the time for a 911 infrastructure. An important fact to keep in mind is that the initial PBX technology that the 911 infrastructure was developed around was pre Internet, pre cell phones and pre SMS—Short Message Service (text)/MMS—Multimedia Service (photos and video clips) from cell phones. With the advancements and popularity of SMS, MMS and broadband, an outdated 911 network rendered these post 1968 technologies as Not Compatible with the 911 network.

The problem of an outdated 911 PBX technology based infrastructure, originally built to handle wireline (or landline) calls to 911, is further being compounded by fact that the volume of wireless calls to 911 continues to increase. Per the FCC, the percentage of calls to 911 from cell phones is now well over 70% nationwide. Wireless calls have now and continue to become the primary method to contact 911. Wireless calls were being handled by a call flow architecture developed in the 70's. In understanding this bit of history of the evolution of the 911 infrastructure, one begins to understand how the handling of wireless calls was retrofitted into what was a wireline only architecture. In electing to retrofit wireless calls into a wireline infrastructure, the providers of the 911 infrastructure found themselves having to revise what was rapidly becoming an outdated infrastructure in order to obtain the same type of reporting data being received for wireline calls. This was a major undertaking and took many years to accomplish.

While these reporting revisions were taking place, this retrofitting was further complicated by the fact that at the time the relatively recent phenomenon of texting (SMS), implemented in 1992, and Picture Messaging (MMS), implemented in 2002, started to trend and eventually become a very popular means of communication that are now mainstream 21st century communication tools.

Unlike wireless calls, the original 911 PBX based infrastructure (which was implemented before SMS and MMS), could not be retrofitted to handle SMS/MMS using the 70's PBX based architecture and technology. Further complicating these issues was the fact that cell phones are not tied to a physical address. Then in 2004, Qualcomm changed not being able to locate a cell phone by introducing GPS into cell phones.

This new GPS technology demanded a major overhaul in order to pull a cell phone's location. This upgrade was handled by retrofitting the pulling of a cell phone's location into an already dated 1970's 911 infrastructure. This retrofit also required the PSAPs (Public Service Answering Point) to first change their infrastructures in order to be what the FCC and Public Safety Standards Committees deemed Phase I and Phase II upgrades. These upgrades also referred to as Enhanced 911 or E911, required the carriers to begin providing information that is more precise to the PSAPs, specifically latitude and longitude of wireless callers within 50 to 300 meters of the location of the cell phone calling 911.

These advancements, still taking place today, (as with all 911 advancements), require the coordination between 7,000+public safety agencies, Standards Committees, wireless carriers, technology vendors, equipment manufacturers and local wireline carriers. This massive undertaking has already taken more than a decade and continues to be a work in progress.

Though PBX technology has evolved into an IP (Internet Protocol) based Unified Communication systems capable of handling video chat and instant messaging, etc., these evolved PBX based systems are not compatible with the rest of the 911 infrastructure. Even if a PBX based system could allow the PSAP to handle photos or videos, there remains the issue of core 911 infrastructure not being able to get a photo or video through the 911 infrastructure.

Currently emergency call centers, such as 911 facilities, typically receive emergency calls via telephone from a person reporting an emergency. The person verbally reports the emergency and the operator documents the report. The operator then calls the appropriate emergency personnel and relays the report. Unfortunately, the operator is capable of relaying very little data to the emergency personnel. The vast majority of operators cannot, for example, relay text, audio, photographic, or video files sent from the person reporting the emergency to the operator.

In some emergency situations, the telephone system that emergency call centers use is not operational. This is common when natural disasters occur. Unfortunately, when the telephone system fails, there are few other ways to communicate with emergency personnel.

In view of the foregoing problems, it would be particularly advantageous to provide a system that would facilitate communication of text, audio, photographic, and/or video data to emergency personnel.

SUMMARY OF THE APPARATUS AND METHOD

It is therefore an object of the invention to provide an apparatus and method for receiving and sending information about an emergency situation in which a user can send and receive audio, text, photographic, and/or video data from a user operated mobile communications device to a communications center so that the data can be used to handle the emergency situation and dispatch the appropriate resources.

It is further an object of the invention to provide an apparatus and method for emergency response personnel to take control of a Citizens device, such as a mobile phone, and direct the uses of the resources of the device as needed including sharing with or transferring control of the device with other emergency response personnel According to a system aspect of the invention, a computer based system for sending and receiving information about an emergency situation is provided which comprises at least one network connected computer system having a processor and machine readable memory. The system is configured to receive a first emergency communication at a communications center from a user operated mobile communications device transmitting the communication to a network in data communication with the communications center, the first emergency communication being associated with an emergency incident.

The system is further configured to execute an operator interface at a communications center computer or tablet or other wired/wireless appliance for allowing an operator to generate an electronic data request message querying the user to respond thereto with audio, text, photographic, and/or video and data files about the emergency situation, the data files being stored on the user operated mobile communications device or at a location remote from the user operated mobile communications device.

The system is further configured to transmit the electronic data request message from the communications center via the network to the user operated mobile communications device.

The system is further configured to receive a second emergency communication at the communications center, the second emergency communication being a user executed response to the data request message and including audio, text, photographic, and/or video and data files about the emergency situation retrieved from the user operated mobile communications device or location remote from the user operated mobile communications device.

Currently there are a small number of companies that are certified to provide Text-to-911 services in the USA. Of those companies certified to perform Text-to-911 service, most are required to have the Text Control Center (TCC) pass the Text-to-911 messages to the PSAP's Customer Premise Equipment (CPE). This means that there are very few companies, actually capable of delivering MMS directly to the PSAP and down to their CAD solution. This is, in part, because of the limitations that prohibit passing MMS through the CPE that consists of legacy PBX equipment, etc.

As previously stated, " . . . unlike wireless calls, the original 911 PBX based infrastructure (which was implemented before SMS and MMS), could not be retrofitted to handle SMS/MMS using the 70's PBX based architecture and technology. Further complicating these issues was the fact that cell phones are not tied to a physical address. Then in 2004, Qualcomm changed not being able to locate a cell phone by introducing GPS into cell phones."

A unique aspect of Applicant's multimedia centric adaptive emergency response messaging apparatus and method solution is that when using it the TCC passes the Text-to-911 message directly to Applicant's solution [also referred to as NexGen's Emergency Services IP Network (ESInet)]. This network, called the RID (Receive, Identify & Distribute) Network by NexGen, is compatible with key emergency response data communication architectures (such as PSAPs, TCCs, and Computer Aided Dispatch sites) and can directly feed data to these end users across various architectures, by receiving and applying dynamic inputs/outputs (such as hardware/software protocols, agency rules, user profiles, jurisdiction resource info access, etc.).

NexGen's Text-to-911 solution does not have the restrictions imposed on the solutions developed by other vendors since the TCC passes the Text-to-911 messages directly to NexGen ESInet RID Network first, as opposed to the CPE.

NexGen's architecture also allows for receiving photos and videos (MMS) from the TCC. These MMS messages can be forwarded to a Dispatcher via a RID Network interface with the applicable Dispatcher's site's CAD solution so that the MMS message is fed directly to the Dispatcher's CAD Workstation.

Other novel features which are characteristic of the apparatus, as to organization and method of operation, together with further objects and advantages thereof will be better understood from the following description considered in connection with the accompanying figures, in which preferred embodiments of the apparatus are illustrated by way of example. It is to be expressly understood, however, that the figures are for illustration and description only and is not intended as a definition of the limits of the apparatus. The various features of novelty which characterize the apparatus are pointed out with particularity in the claims annexed to and forming part of this disclosure. The apparatus resides not in any one of these features taken alone, but rather in the particular combination of all of its structures for the functions specified.

According to a system aspect of the invention, a computer based system for sending and receiving information about an emergency situation comprises at least one network connected computer system having a processor and machine readable memory. The system is configured to receive a first emergency (and non-emergency) communication at a communications center from a user operated mobile communications device transmitting the communication over the network connected computer system in data communication with the communications center, the first emergency communication being associated with an emergency situation.

There has thus been broadly outlined the more important features of the apparatus in order that the detailed description thereof that follows may be better understood, and in order that the present contribution to the art may be better appreciated. There are, of course, additional features of the apparatus that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present apparatus. It is important, therefore, that the claims be regarded as including such equivalent constructions insofar as they do not depart from the spirit and scope of the present apparatus.

Further, the purpose of the Abstract is to enable the national patent office(s) and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the apparatus of this application, which is measured by the claims, nor is it intended to be limiting as to the scope of the apparatus in any way.

BRIEF DESCRIPTION OF THE DRAWINGS

The apparatus will be better understood and objects other than those set forth above will become apparent when consideration is given to the following detailed description thereof. Such description makes reference to the annexed drawings, wherein:

FIG. 1A is a general overview chart of the multimedia centric adaptive emergency response messaging apparatus and method;

DETAILED DESCRIPTION OF THE EMBODIMENTS

Figure 1:
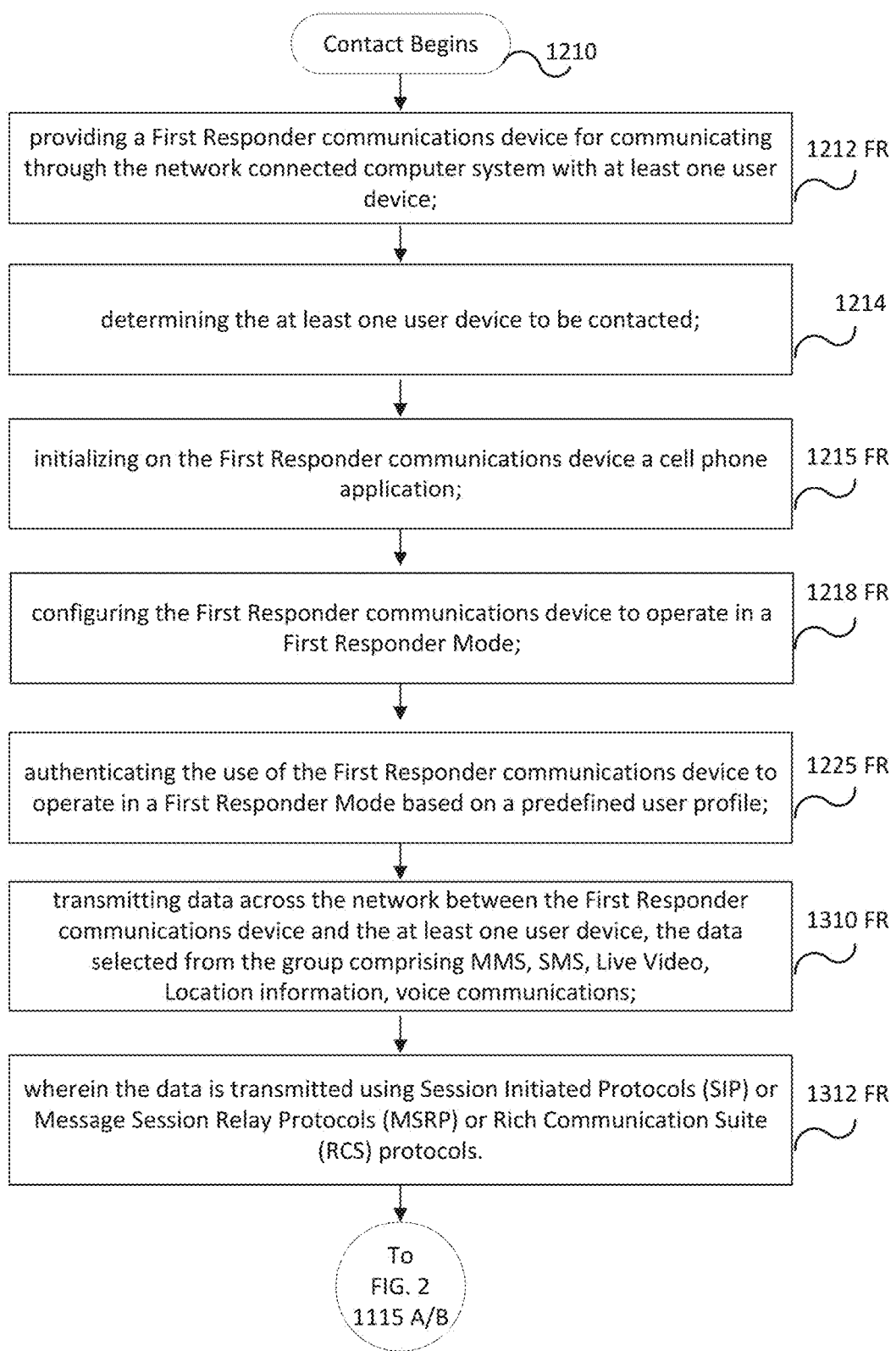
FIG. 1 is a First Responder Usage flow chart.
Figure 2:
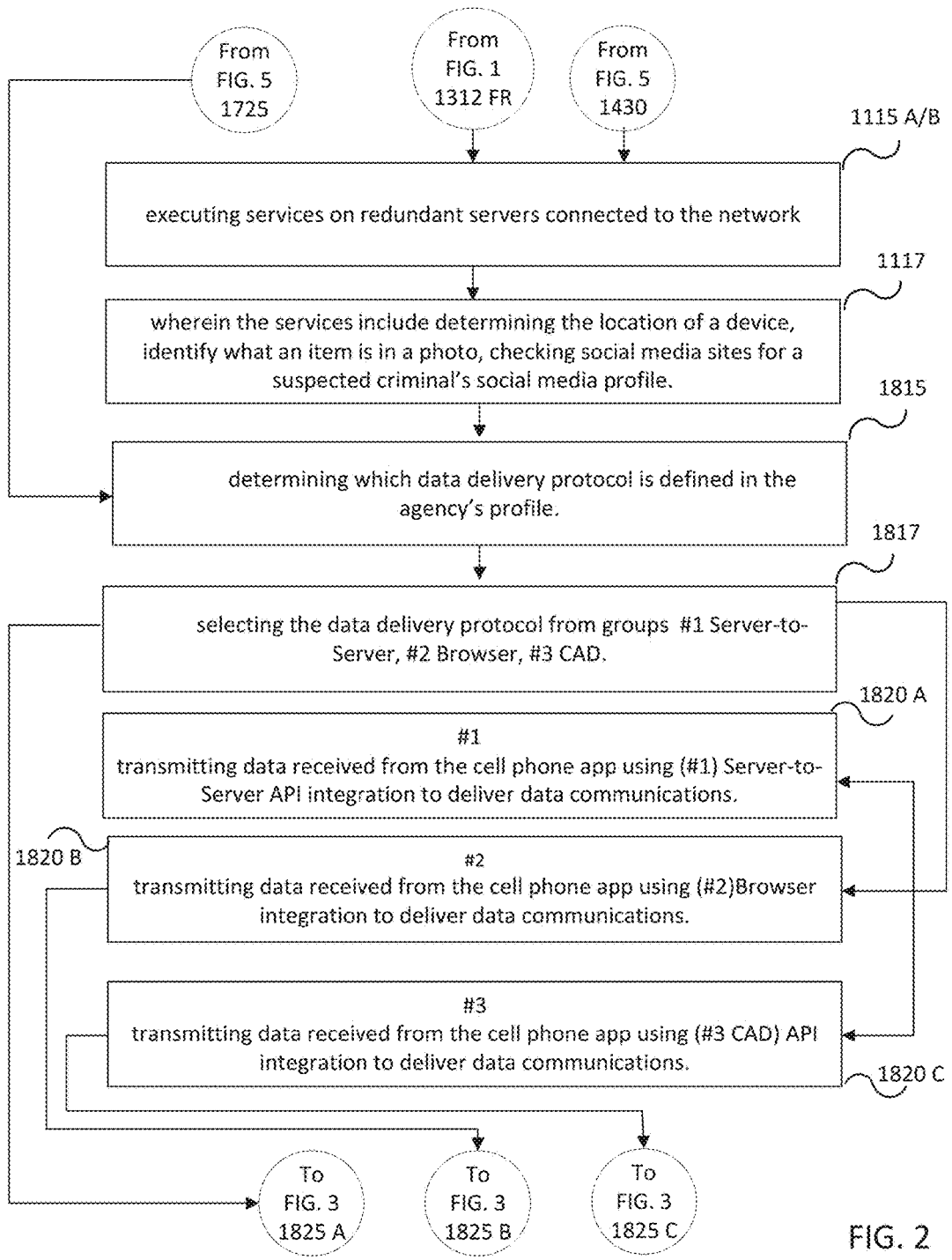
FIG. 2 is a First Responder Usage flow chart—apply protocols and functions.
Figure 3:
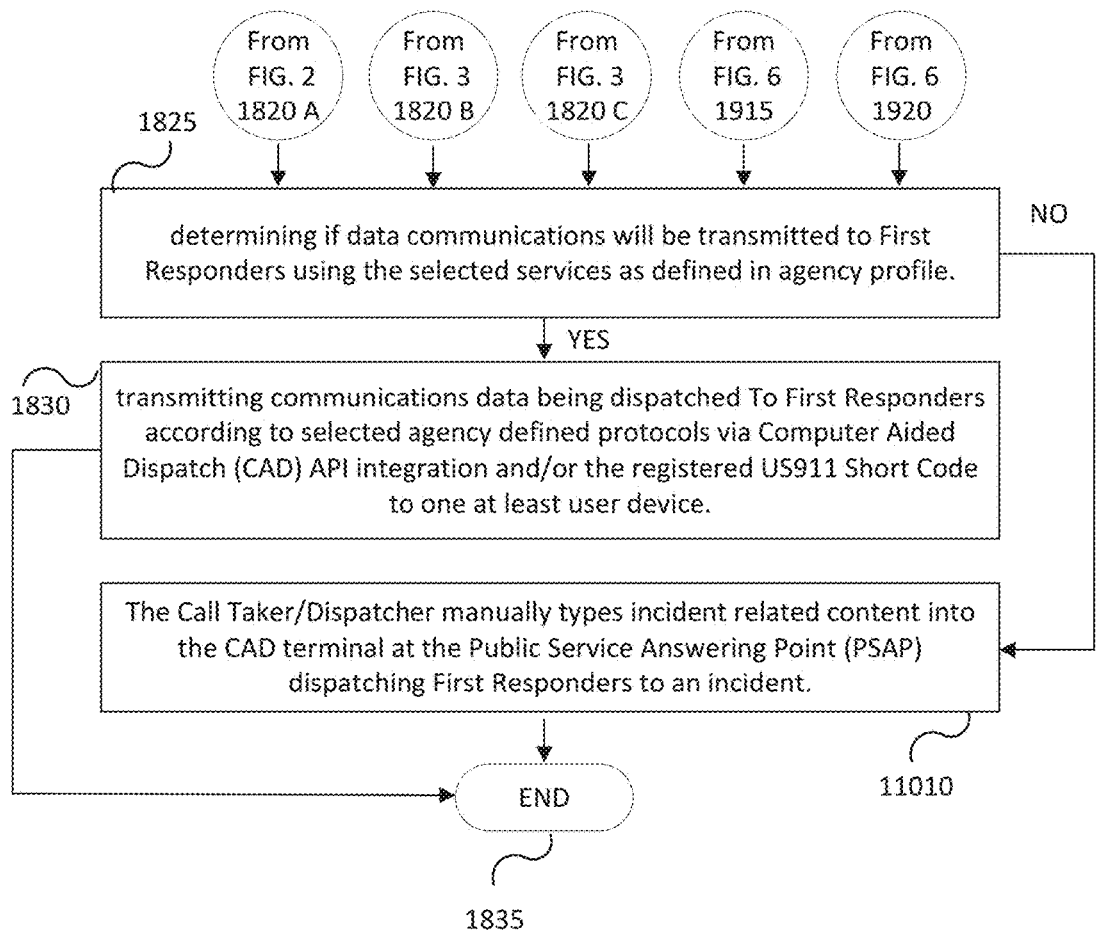
FIG. 3 is a First Responder Usage flow chart—routing and delivery functions.

In a first embodiment, as shown at least in FIGS. 1A, and 1-11, the multimedia centric adaptive emergency response messaging apparatus 10 and method is presented here in an emergency response communications method for exchanging information about an emergency situation, the method being executed by at least one network connected computer system having a processor and machine readable memory.

The general components of the multimedia centric adaptive emergency response messaging apparatus and method includes:

Referring now to FIG. 1A, according to an embodiment of the multimedia centric adaptive emergency response messaging apparatus and method, a system 10 for receiving information about an emergency situation includes a messaging computer system 425/430 in a data communication relationship with one or more mobile communications device 115, and a communications center 425/430. The communications center 425/430 is also in a data communication relationship with one or more receivers 610, 615, 620, 625.

The messaging computer system 425/430 can include a wireless appliance 115, and the messaging computer system 425/430 includes a messaging database and other database servers 425/430, and includes an Internet server 425/430. The messaging computer system 425/430 also includes one or more processors that carry out computer readable program instructions stored on machine readable memory.

The system 10 allows people to transmit and receive audio, video, text, and/or photographic data to the network connected communications center 18 via network resources and protocols such as Rich Communication Suite (RCS), Broadband, Session Initiation Protocol (SIP), Message Relay Protocol (MSRP), and other protocols and may also include connectivity such as via satellite or other connectivity medium/mode including, but not limited to: Wi-Fi, broadband, Near Field Communications, Bluetooth, Wide Area Networks, Local Area Networks, and Personal Area Networks. Suitable types of communication centers for which the system 10 is particularly beneficial include, but are not limited to, emergency call centers (that may also handle non-emergency communications), 911 call centers, fire departments, police departments, hospitals, schools, security forces, or the like.

An exemplary network connected computer system employing this multimedia centric adaptive emergency response messaging apparatus and method is NexGen's Emergency Services IP Network (ESInet) called the RID (Receive, Identify & Distribute) Network which, among other things, is certified to provide Text-to-911 message exchanges with Public Service Answering Points (PSAPs) and Text Control Centers (TCC) nationwide. NexGen's architecture also allows for receiving photos and videos (MMS messages) from PSAPs and TCCs. The MMS messages can be directly exchanged via an interface between the PSAPs/TCCs Computer Aided Dispatch solution and NexGen's RID Network.

As shown in FIG. 1A, the multimedia centric adaptive emergency response messaging apparatus 100 is integrated into an emergency response general ecosystem 199 of users (such as First Responders and Citizens) as well as Administrators (such as Text Control Centers, Public Service Answering Points, and Dispatchers) and Logistical Support (such as NexGen).

Figure 8:
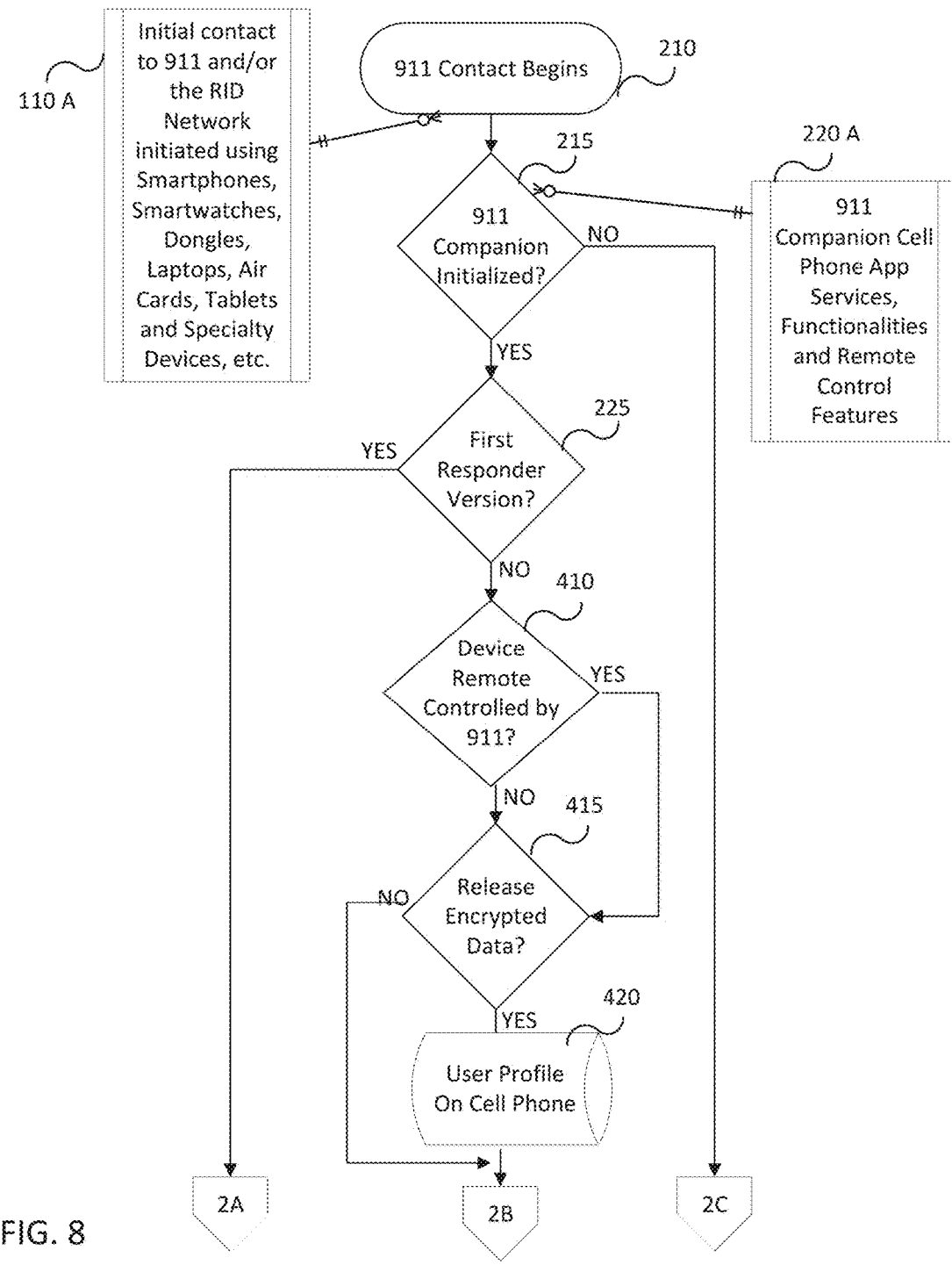
FIG. 8 is a general usage flow chart.
Figure 9:
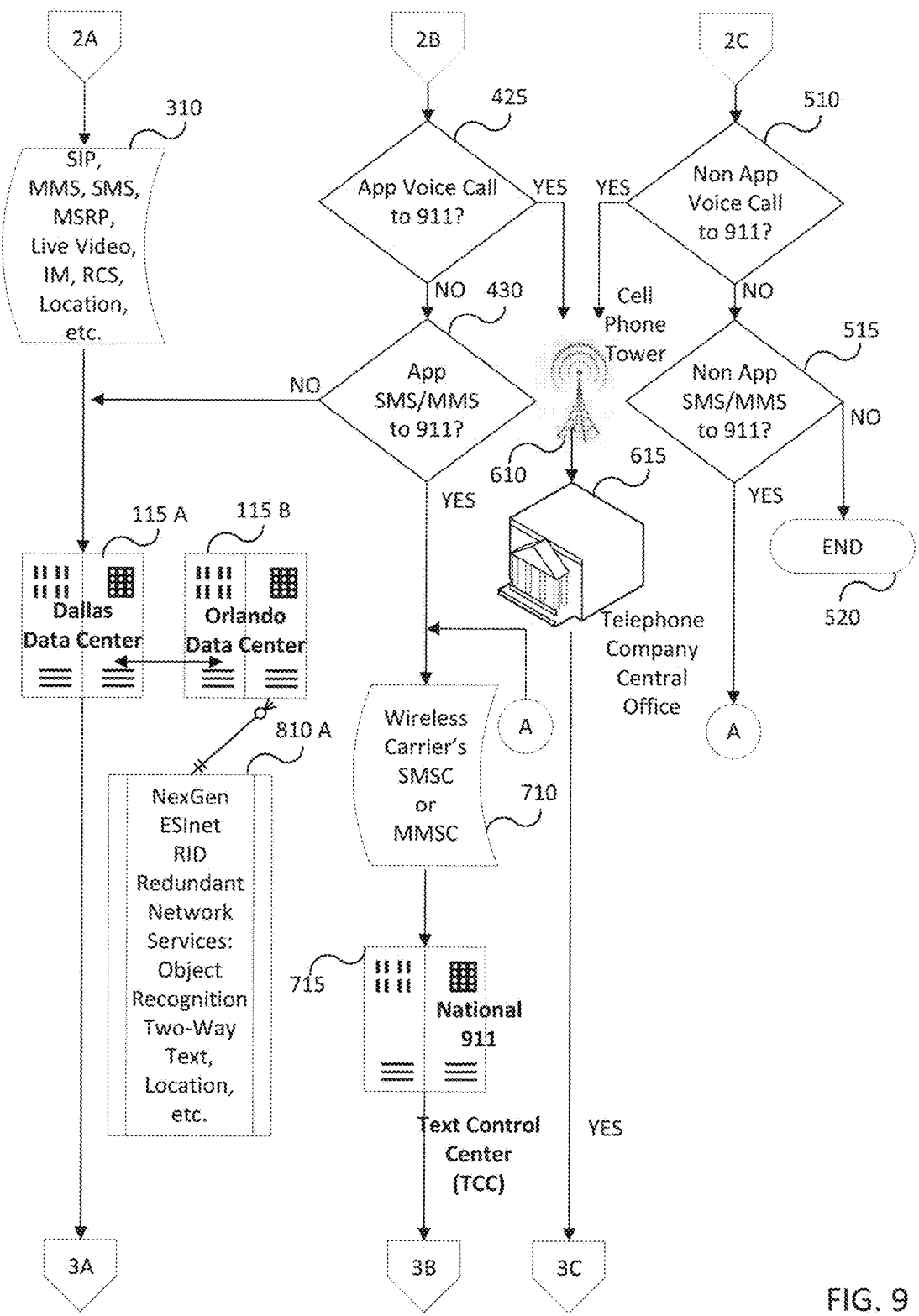
FIG. 9 is a general usage flow chart—applying protocols and routing calls.
Figure 10:
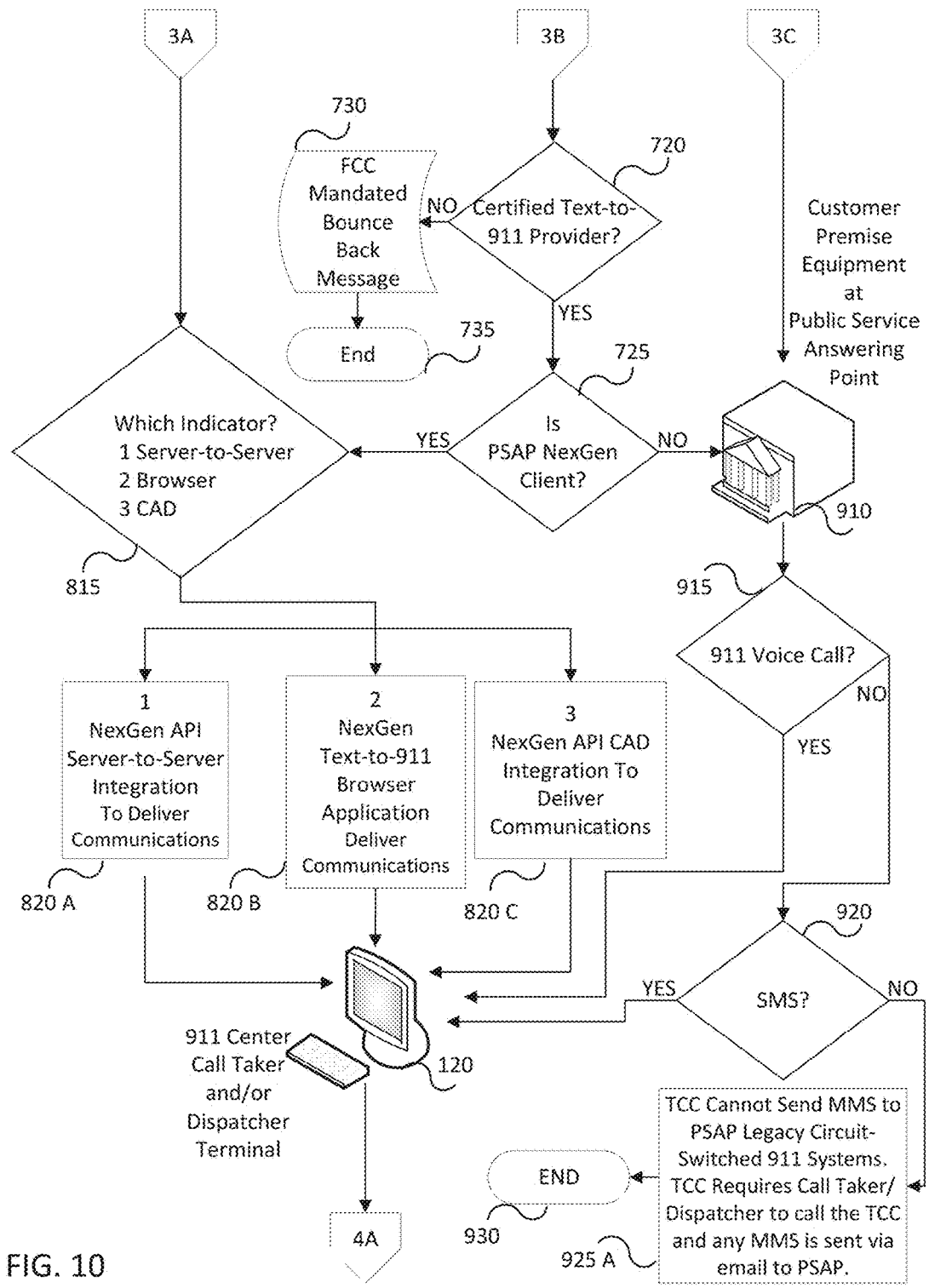
FIG. 10 is a general usage flow chart—applying delivery functions.
Figure 11:
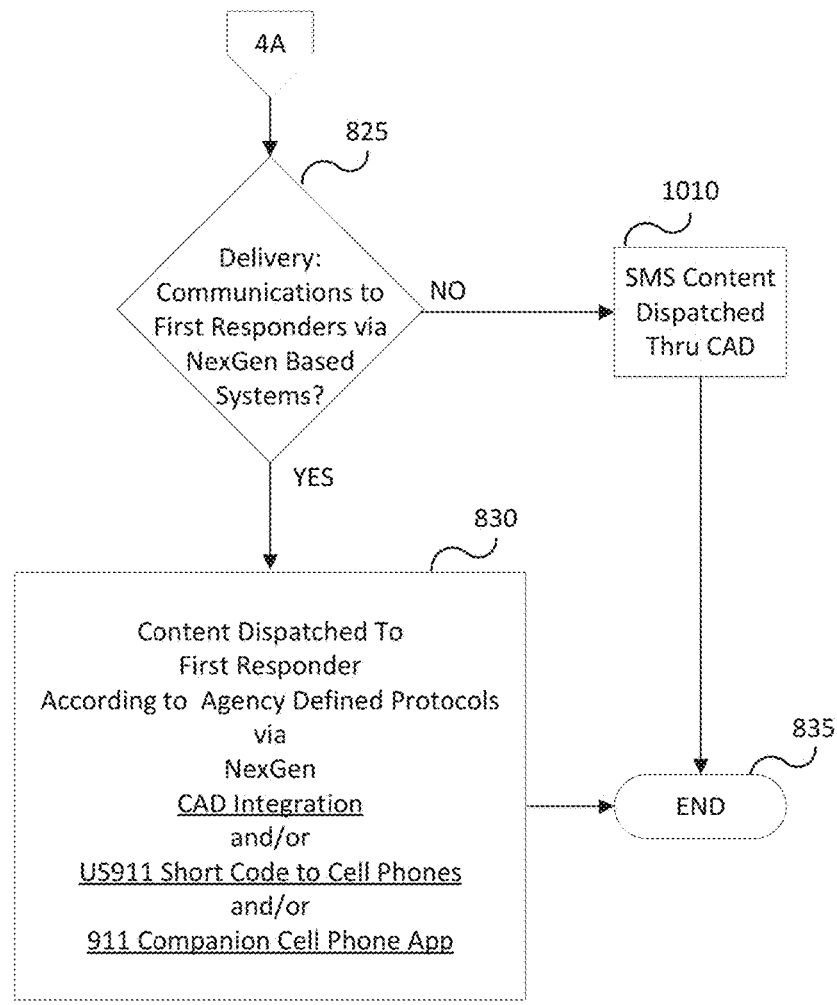
FIG. 11 is a is a general usage flow chart—applying delivery functions.

As shown in FIG. 1 and FIG. 8, an exemplary use of the multimedia centric adaptive emergency response messaging apparatus 100 by a First Responder begins with the First Responder being provided a communications device for communicating thru the network connected computer with at least one user device.

The process includes steps such as determining the at least one user device to be contacted; initializing on the First Responder communications device a cell phone application (referred to herein as the NexGen Phone App); configuring the First Responder communications device using the cell phone and/or the NexGen Phone App to operate in a First Responder Mode; authenticating the use of the First Responder communications device to operate in a First Responder Mode based on a predefined user profile; transmitting data across the network between the First Responder communications device and the at least one user device, the data selected from the group comprising MMS, SMS, Live Video, Location information, voice communications; wherein the data is transmitted using Session Initiated Protocols (SIP) or (Message Session Relay Protocols (MSRP) or RCS Rich Communication Suite (RCS) protocols, and/or other applicable protocols.

Note—the cell phone functions can be controlled via the cell phone itself or via the cell phone application (the NexGen Phone App) or both.

As indicated in FIG. 2-3 and FIGS. 9-10 the data content and applicable protocols are determined and the message is routed from the First Responder to the applicable user device via selectable data modality.

A change in an Agency's data exchange resources (such as added temporary First Responder manpower) during an active emergency situation would be reflected in a change to the Agencies protocols and Agency defined profiles so that as the available resources expand and contract the multimedia data will continue to flow.

Figure 4:
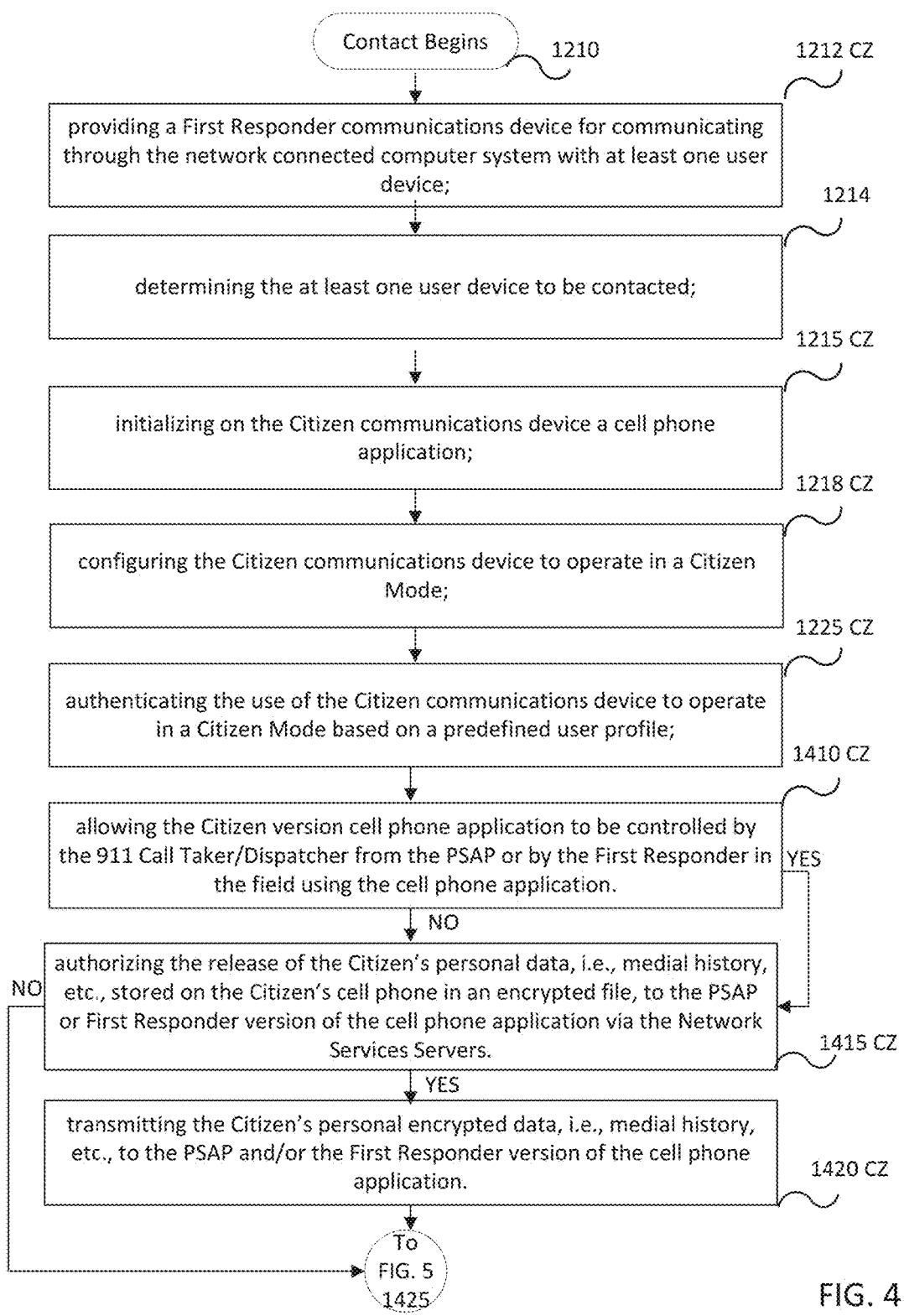
FIG. 4 is a Citizen Usage flow chart.
Figure 5:
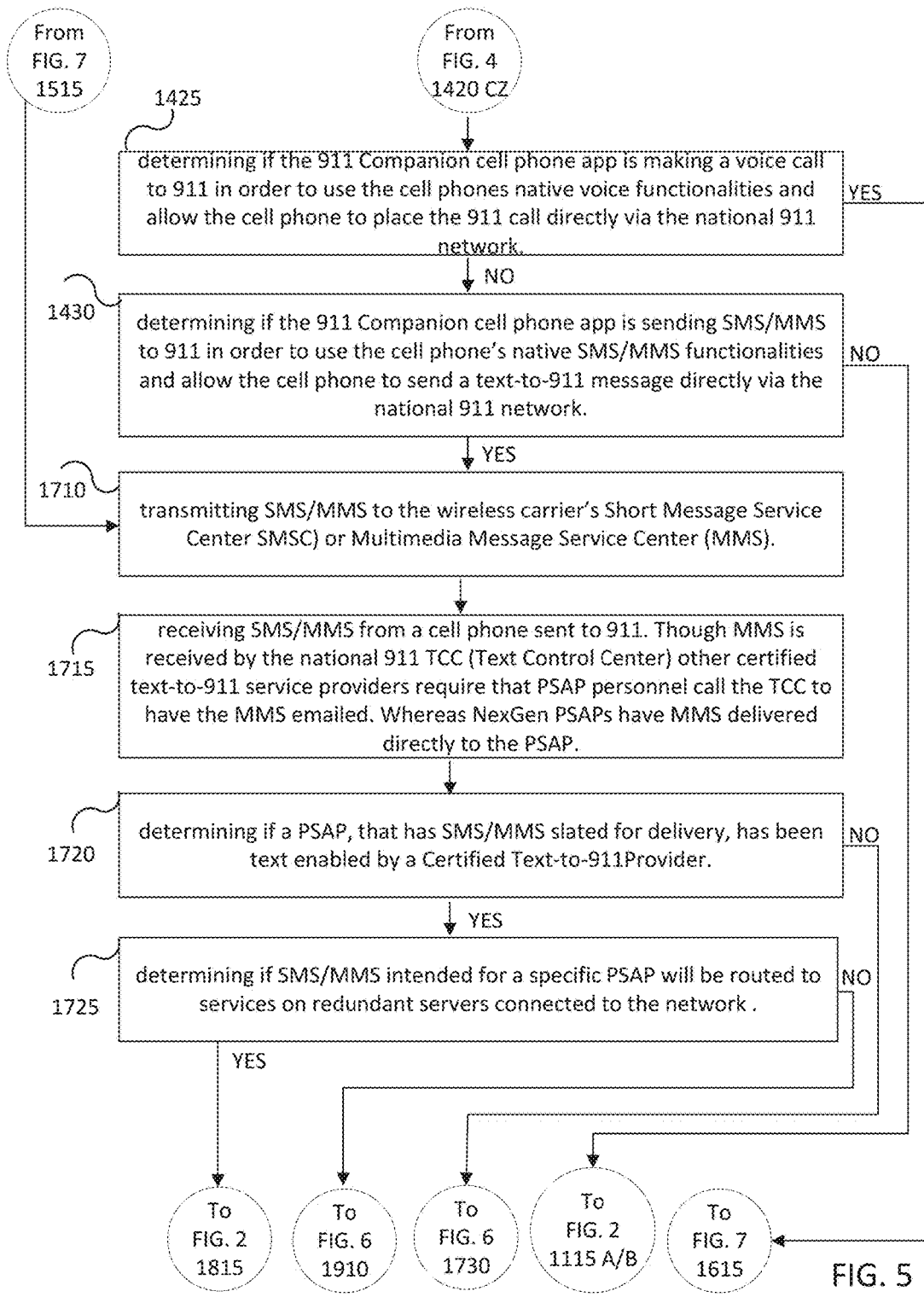
FIG. 5 is a Citizen Usage flow chart—apply protocols and functions.
Figure 6:
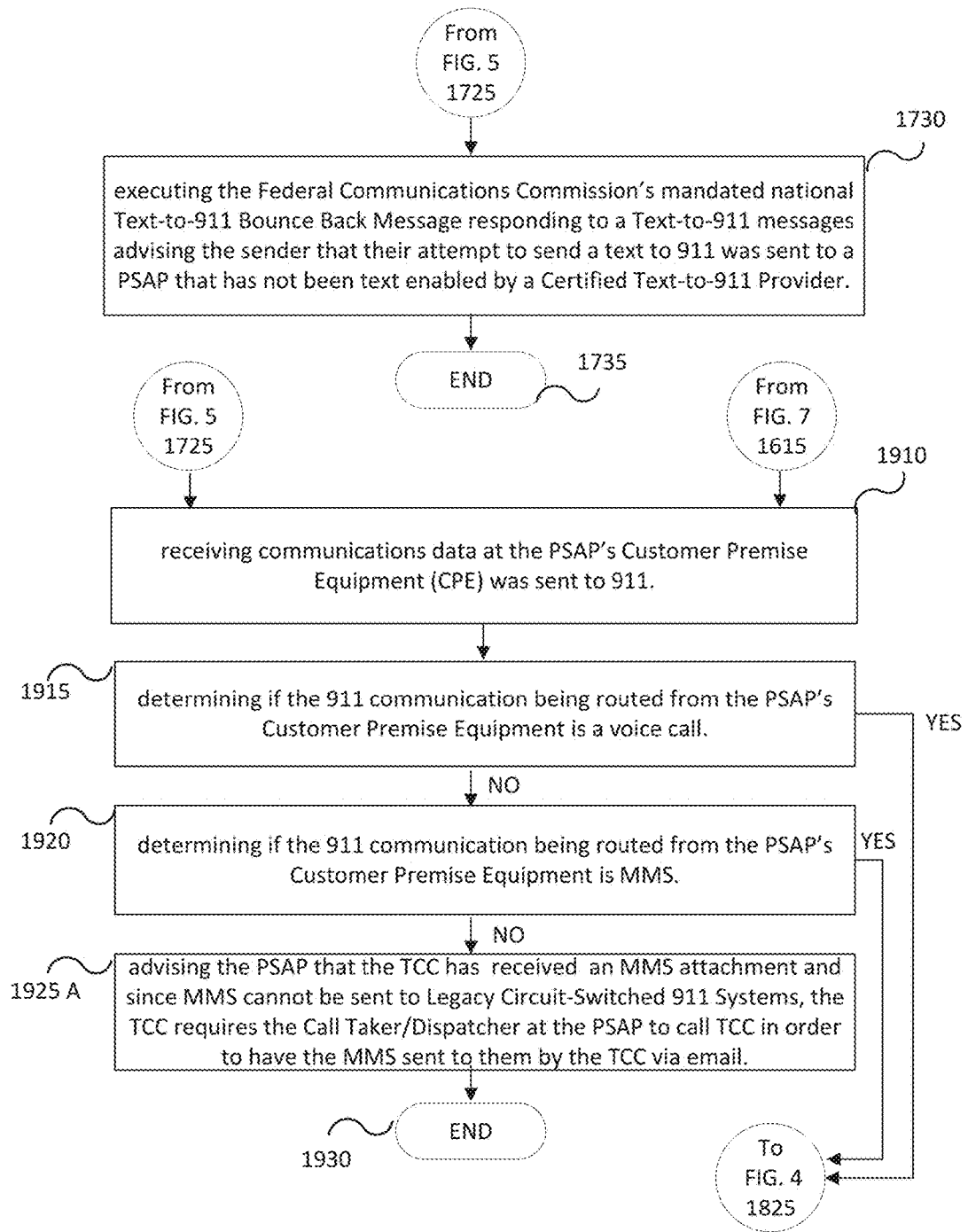
FIG. 6 is a Citizen Usage flow chart—routing and delivery functions.

As shown in FIG. 4, an exemplary use by a Citizen begins with the Citizen being provided a communications device for communicating thru the network connected computer with at least one user device.

As shown in FIG. 5-6, and FIGS. 9-10 the data content and applicable protocols are determined and the message is routed from the Citizen to the applicable user device.

Figure 7:
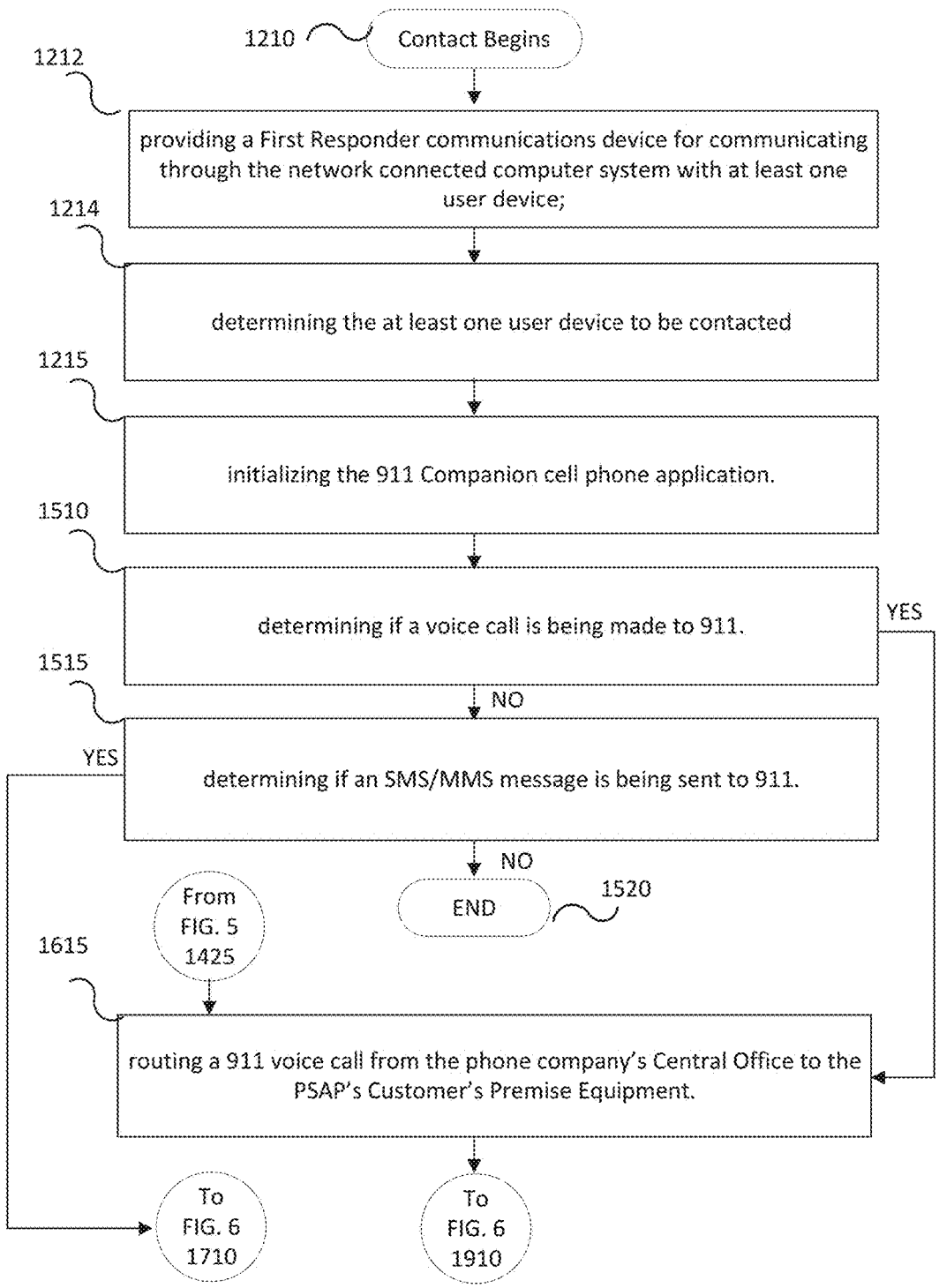
FIG. 7 is a Non-App Citizen Usage flow chart.

As shown in FIG. 7, an exemplary use without the cell phone app begins with the Citizen/First Responder being provided a communications device for communicating thru the network connected computer with at least one user device and the message is eventually routed to the applicable user device or to a mandated Bounce-Back-Message.

As shown in the flow charts of at least FIG. 1A, and FIG. 1 thru FIG. 17, a number of decisions must be made as the message (voice, text, and/or multimedia data) migrates through the multimedia centric adaptive emergency response messaging apparatus 100. Further, while the data flow arrows in FIG. 1A, and FIG. 1 thru FIG. 17 are provided in a specific direction to match exemplary uses (such as by a First Responder or a Citizen) the data flow arrows can be one directional or bi-directional where the data sender can also receive data and the data receiver can also send data.

The multimedia centric adaptive emergency response messaging apparatus and method employed by NexGen's RID Network focuses on three core groups of functions (Receive, Identify & Distribute) and dynamically routes the call voice and data in the most suitable way for connecting callers with the applicable user device.

With regards to the Receive functions, the multimedia centric adaptive emergency response messaging apparatus can accept calls which are voice only, voice and data and/or data only. The apparatus may include fixed and/or mobile hardware such as data lines, modems, and antennas which capture multiple modes of incoming communications. The messaging apparatus applies a variety of initialization and configuration alternatives such as using predefined user profiles established by appropriate agencies. Users must comply with the applicable agency requirements to be granted access to the agency's emergency response resources.

With regards to the Identify functions, the multimedia centric adaptive emergency response messaging apparatus applies a variety of configuration alternatives for identifying call content as well as caller information and data system information (such as the text or mms capabilities of the PSAPs and TCCs).

With regards to the Distribute functions, the multimedia centric adaptive emergency response messaging apparatus employs a variety of protocols and predefined profile information to optimally align with the end users (such as by routing MMS data to TCCs and/or PSAPs who have MMS capabilities and routing only text and/or voice calls to TCCs and/or PSAPs who do not have MMS capabilities).

As noted previously, the current 911 infrastructure is not designed for receiving calls which also have MMS associated with the call and therefore calls having MMS are randomly routed using ad-hoc means including faxing and/or emailing the MMS as an attachment rather than concurrently transmitting the MMS data with the call.

Figure 12:
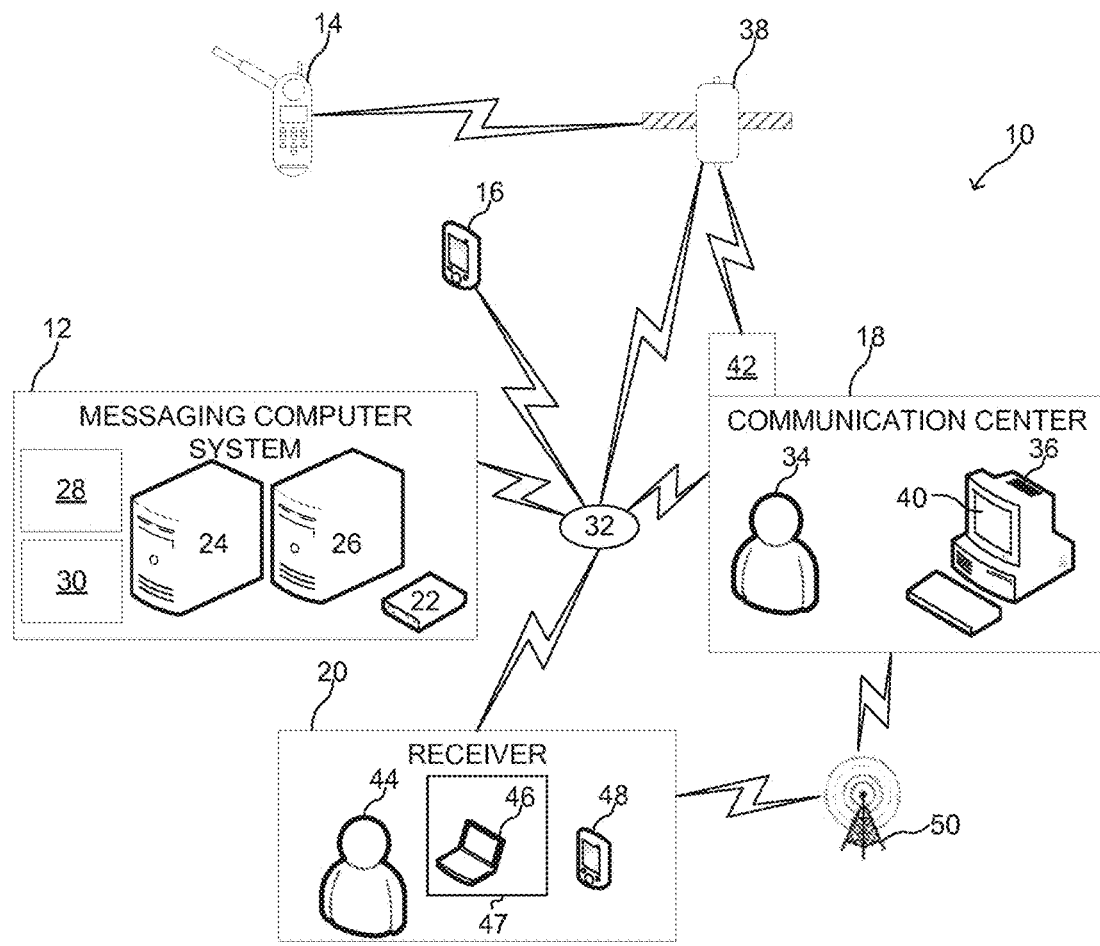
FIG. 12 is a schematic diagram of a system for receiving emergency information according to an embodiment of the invention.

Referring now to FIG. 12, according to an alternate embodiment of the multimedia centric adaptive emergency response messaging apparatus and method, a system 10 for receiving information about an emergency situation includes a messaging computer system 12 in a data communication relationship with one or more mobile communications device 14,16, and a communications center 18. The communications center 18 is also in a data communication relationship with one or more receivers 20.

The messaging computer system 12 can include a wireless appliance 22, a messaging database and other database servers 24, and includes an Internet server 26. The messaging computer system 12 also includes one or more processors 28 that carry out computer readable program instructions stored on machine readable memory 30.

The invention is not limited to any particular number, type, or configuration of processors 28, nor to any particular programming language, memory storage format or memory storage medium. In embodiments of the messaging computer system 12 involving multiple processors 28 and/or machine readable memory 30 storage media, the system 10 is not necessarily limited to any particular geographic location or networking or connection of the processors 28 and/or machine readable memory 30 storage media, provided that the processors 28 and/or machine readable memory 30 storage media are able to cooperate to execute the disclosed interfaces, databases, modules, and functions. Further, it is not necessarily required that the processors 28 and/or machine readable memory 30 storage media be commonly owned or controlled.

The system 10 allows people to transmit and receive audio, video, text, and/or photographic data to the network connected communications center 18 via network resources and protocols such as Rich Communication Suite (RCS), Broadband, Session Initiation Protocol (SIP), Message Relay Protocol (MSRP), and other protocols and may also include connectivity such as via satellite or other connectivity medium/mode including, but not limited to: Wi-Fi, broadband, Near Field Communications, Bluetooth, Wide Area Networks, Local Area Networks, and Personal Area Networks. Suitable types of communication centers 18 for which the system 10 is particularly beneficial include, but are not limited to, emergency call centers (that may also handle non-emergency communications), 911 call centers, fire departments, police departments, hospitals, schools, security forces, or the like.

The communications center 18 can then transmit and receive the audio, video, text, data files, and/or photographic data to the receiver 20. In typical embodiments, the receiver 20 includes emergency personnel such as police officers, fire fighters, first responders, security personnel, other emergency personnel, news media outlets, or the like. The receiver 20 may also be a person or entity who subscribes to the system 10 in order to have communications and alerts sent to them.

An Internet network 32 facilitates communication between the messaging computer system 12 and communication center 18. A communications center operator 34 operating a communications center computer system 36 and/or or wired/wireless appliance 22 interfaced with the network 32 is able to send and receive data to/from the messaging computer system The communications center 18 is adapted to send and receive data communications from various types of mobile communications devices, including, but not limited to, satellite phones 14 and mobile phones 16. Satellite phones 14 and mobile phones 16 are provided as preferred examples only. Other types of mobile communications devices that can be used are laptop computers, PDAs, tablet computers, and the like.

The messaging computer system 12 is capable of sending and receiving electronic communications from these mobile communications devices 14, 16. Examples of such electronic communications include SMS messages, MMS messages, data files, or the like. This capability allows a user operating a mobile communications device 14, 16 to record a video, stream live video, take a photograph, record an audio file, and/or input a text message and send it to the messaging computer system 12 so that it may eventually be dispatched to the appropriate receiver 20.

When the messaging computer system 12 receives an electronic communication from a mobile communications device 14, 16, the communication is routed through the wireless appliance 22 or through the Internet connected network. The wireless appliance 22 is a device that allows a computer to transmit or receive data over the network 32 as is the Internet connected network. Examples of suitable wireless appliances 22 include MMI connections, modems, MM4 connections, and MM7 connections. A preferred wireless appliance is a General Packet Radio Service or "GPRS" device capable of transmitting SMS and MMS communications. The wireless appliance 22 if utilized in lieu of or in combination with the Internet connected network, then transmits the communication to the messaging database serve 24 where the data contained in the communication is stored.

The messaging computer system 12 is configured to execute an interface 40 at the communications center 18. The interface 40 allows the communications center operator 34 to access the messaging computer system 12 via the Internet connected network 32. The interface 40 is displayable on the communications center computer system 36. In a preferred embodiment the interface 40 is a website executed by the messaging computer system 12. In another preferred embodiment, the interface 40 is provided by a computer program installed on the communications center computer 36. The interface 40 allows the operator 34 to both communicate with the messaging computer system 12 and to send and receive data, such as electronic communications from the messaging computer system 12. The internet server 26 facilitates communications between the communications center 18 and the messaging computer system 12.

When the cellular telephone or conventional telephone systems are not operational, the mobile communications devices 14, 16 may still communicate with the communications center 18 through the network 32. Satellite phones 14 and other mobile devices, connected to the network for example via WiFi, communicate with the communications center 18 via a satellite system 38 that is also connected to the network 32. Likewise mobile phones 16 communicate with the communications center 18 via the network 32, which is provided by a satellite and/or a broadband Internet network.

Use of a satellite system 38 is particularly advantageous because it provides both Internet connectivity and satellite connectivity. A satellite phone 14 communicates with the communications center 18 by transmitting a communication signal to the satellite system 38, which then transmits the communication to a satellite transceiver 42 in data communication with the communications center computer system 36.

The satellite system 38 is also adapted to facilitate communications through the network 32 for allowing mobile phones 16 to communicate with the communications center 18 when the conventional cellular or wireless phone network system is down. This is achieved by using a satellite system 38 that provides Internet connectivity to the network 32. A preferred satellite system 38 suitable for this purpose is a Broadband satellite Global Area Network (BGAN), which is an Internet network including a plurality of satellites cooperating to provide Internet connectivity to a geographical region. One of the advantages of using a BGAN is that one does not need to use a bulky satellite dish to communicate with the satellite network 32. Instead, one can simply connect a more or less tablet sized BGAN transceiver terminal to a computer to provide the computer with Internet access. The typical BGAN transceiver terminal communicates with the satellite system 38 in the microwave frequency band.

The messaging computer system 12 is adapted to send information via the network 32 to the receiver 20. The receiver 20 includes personnel 44 having access to a receiver operated mobile communications device 48, such as a mobile or satellite phone and, often but not necessarily, a mobile data terminal 46 such as a computer, tablet, or mobile-type device capable of displaying information on a screen. In many cases, the mobile display terminal (MDT) 46 is a computer positioned on the receiver personnel's vehicle 47. Receiver personnel 44, includes but is not limited to, emergency responders such as fire personnel, security police officers, emergency medical personnel, personnel, or the like.

The communications center 18 can transmit and receive data to/from the receiver 20 in various ways. For example, the communications center 18 can send communication signals to the receiver's mobile communications device 48 and/or mobile data terminal 46 (MDT) through an antenna 50 such as a wireless network or cellular antenna. The communications center can also send communication signals to the receiver's mobile communications device 48 and/or mobile data terminal MDT 46 through the network 32. The latter is advantageous because it facilitates communication with the receiver 20 when cellular and telephone infrastructure are not operational.

Figure 13:
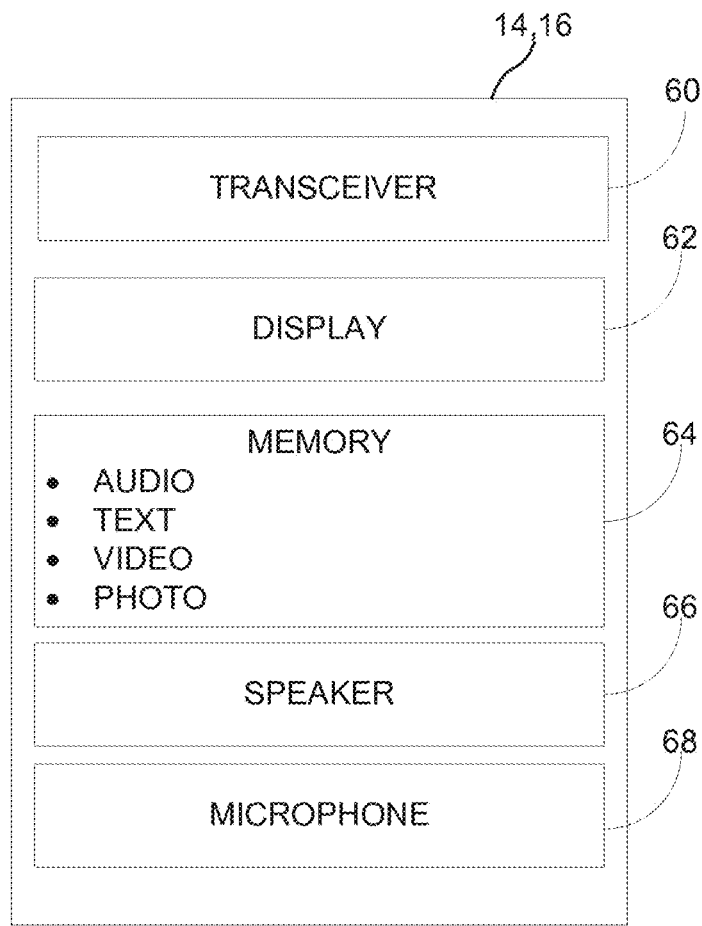
FIG. 13 is a schematic diagram of a user operated mobile electronic device.

Referring now to FIG. 13, a typical mobile communications device 14, 16 includes a transceiver 60 capable of transmitting and receiving wireless signals, a display such as a screen 62, memory capable of storing audio, text, video, photographic and data files, a speaker 66, and a microphone 68. People who encounter emergency situations often memorialize the situation by recording an audio file, writing text notes, recording a video file, and/or taking a photograph of the situation and storing the respective file on the user's mobile communications device 14, 16. The system 10 allows the user to transmit such data files to the communications center 18.

In a typical scenario, the communications center 18 receives a call, email, SMS, or MMS message from a user of a mobile communications device 14, 16 who has encountered an emergency situation. In order to be able to receive the data files from the user's device 14, 16 the operator 34 instructs the messaging computer system 12 to send an electronic data request message to the user's device 14, 16. In order to generate the data request message, the messaging computer system 12 executes a data request page and displays it the operator interface 40.

Figure 14:
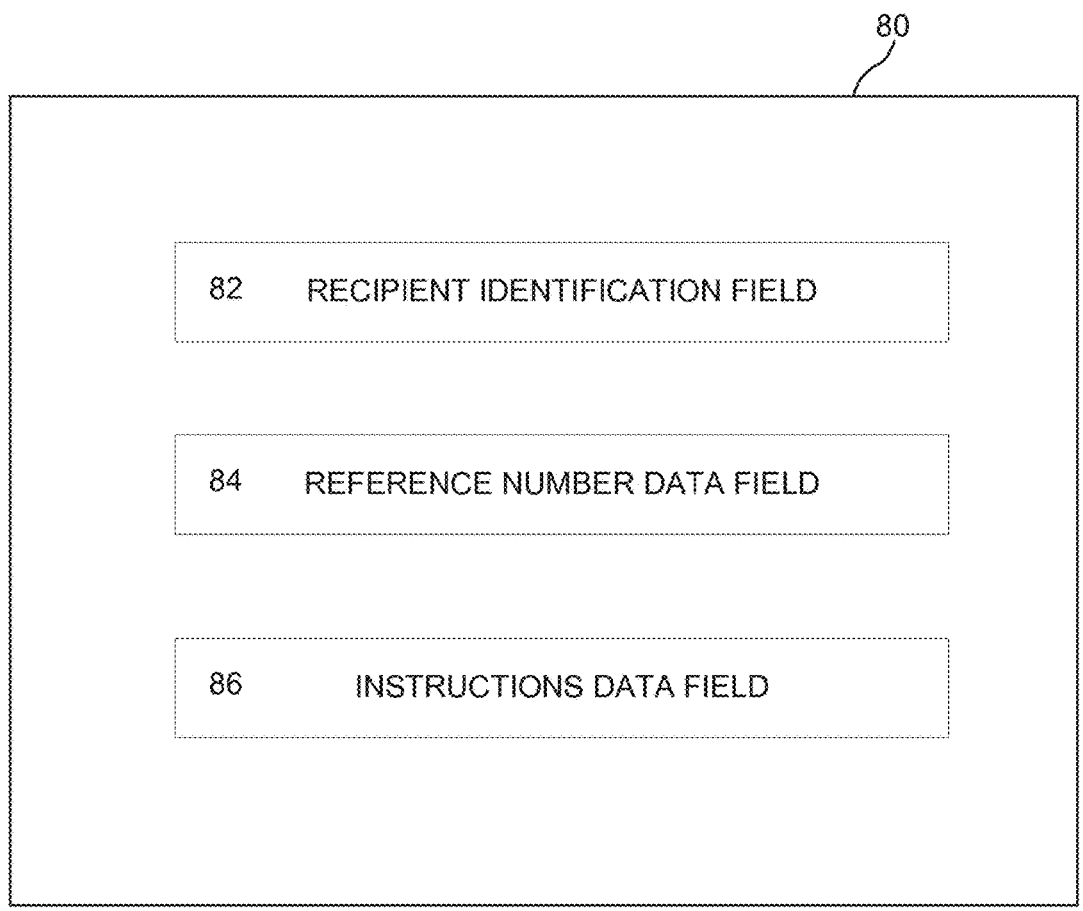
FIG. 14 is a schematic diagram of a data request page.

An exemplary data request page 80, as shown in FIG. 14, includes a plurality of data fields into which the operator 34 can input relevant information. In a recipient identification data field 82 the operator 34 inputs identifying information about the user's mobile communications device 14, 16, such as the device's phone number, etc. If desired, the operator 34 may input a reference number into the reference number data field 84. The reference number is used by the messaging computer system 12 to attribute data to a particular emergency communication. In an instructions data field 86, the operator 34 inputs instructions teaching the user how to respond with audio, text, video, and/or photographic and data files, such as "please reply with media attached to this message". Upon completion of the data request page 80, the messaging computer system 12 transmits an electronic data request message with the instructions to the device 14, 16 via the satellite system 38 and/or the network 32, depending on the type of mobile communications device the user is operating. The user of the device 14, 16 then generates a response to the data request message by attaching the electronic media file (s) the user intends to send to the communications center 18 to the data request message.

Via the interface 40, the operator 34 selects one or more receivers 20 to whom an electronic communication including the user's electronic media data file(s) will be transmitted. The messaging computer system 12 then transmits the electronic media data file(s) to the receiver(s) 20. The receiver personnel 44 may then view or listen to the data file(s) using the receiver operated mobile communications device 48 and/or the mobile data terminal 46.

A particular example of how the system 10 may be used is now described. In this exemplary scenario, a person witnesses a crime and uses a mobile phone 14 to photograph or video the perpetrator. The witness then calls 911.

The 911 operator instructs the messaging computer system 12 to send a data request message to the witness' mobile phone 14 via the network 32. The witnesses' mobile phone 14 receives the data request message. The witness prepares a response to the data request message in which the witness attaches the photograph. The witness' mobile device 14 transmits the response message to the messaging computer system 12 via the network 32. The wireless appliance 22 or Internet connected network receives the message and sends the message data to the messaging database 24 where it is stored for further action such as distribution, etc. The messaging computer system 12 then routes the response message to the 911 call center (the communications center 18).

The communications center computer system 36 receives the response message and the message is displayed at the interface 40. From the interface 40, the operator 34 selects one or more police or other first responders who act as receivers 20. The photograph is dispatched to the police, news media and possibly others. Advantageously, police officers in the field may receive the photograph on their MDT 46 or mobile communication devices 48, allowing the police officers, and other authorized to receive the photo, to view the photo of the perpetrator.

In other embodiments, the internet server 26 receives communications from emergency related websites. These communications include, but are not limited to severe weather alerts, missing person alerts, or other emergency alerts. These communications may be transmitted from the messaging computer system to a receiver 16.

The system may also be adapted to receive geographical coordinates of the user's mobile electronic device 14, 16 so that the operator will know where the device is located. In certain embodiments, this is achieved when the data request message is transmitted to the user's mobile communication device 14, 16. When the data request message is transmitted, the messaging computer system 12 sends a query over the network 32 to obtain the location, or latitude and longitudinal coordinates, of the device 14, 16. The coordinates are then stored in the messaging database 24 for possible further action.

The communications center 18 and the interface 40 may be adapted for use by particular entities. For example, if the communications center 18 is a 911 call center, the interface may be adapted to show the phone numbers of the local police or fire departments, for example.

The messaging server database 24 stores data from every electronic message and data file it receives. These data are accessible via the Internet server 26 to the interface 40 including mobile devices authorized to access the data. This allows a communications center operator 34 to search the messaging server database 24 for audio logs, photographs, videos, text, or phone numbers by typing the search terms into a search field. Suitable search fields include phone number, date, time, channel, comments, identification, and message text, among others.

Figure 15:
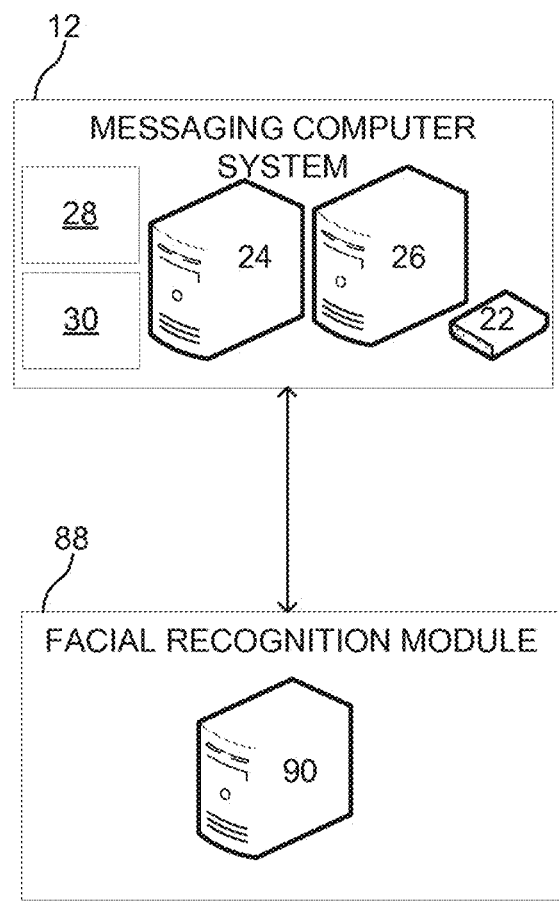
FIG. 15 is a schematic diagram of the messaging computer system executing a facial recognition module.

Referring now to FIG. 15, the messaging computer system 12 is adapted to execute an object recognition module, inclusive of a facial and object recognition module 88 adapted to compare image data (photographic and/or video) retrieved from the user operated mobile communications device 14, 16 to a facial or object feature database 90 storing facial and object feature data of a plurality of pre-identified people and/or pre-identified objects for identifying a match between the photographic data and data of a pre-identified person or object in the database. For example, the facial feature database 90 may include image and or dimension data of the various people's faces thereon. Such data may be retrieved from existing law enforcement databases, driver's license image database, sexual predator databases, National Crime Information Computer databases, missing persons databases, and other Internet accessible image databases.

The facial and object recognition module 88 analyzes the image data retrieved from the user operated mobile communications device 14, 16 to determine whether image data matches an item in the database 90 in order to identify, for example, the face in the image data as a particular person. A conventional facial recognition algorithm may be used to accomplish this. Such systems identify points on a human face that are used to measure features of a person's face, such as the dimensions of the nose, depth of the eye sockets, shape of the cheekbones, and distances between those features to build a numerical impression of the person's face.

These systems capture data for the points on a digital image of a person's face and store the resulting data as a so called "faceprint". The faceprint is then be used as a basis for comparison with data captured from faces in an image retrieved from the mobile communications device 14, 16. In the facial and object recognition module 88, the correlation of points on objects in an image or video or other data file is compared to image or video or other data files includes but is not limited to faceprints.

Where object recognition algorithm relies on matching, learning, or pattern recognition using appearance. These systems capture data on a digital image and store the resulting data as a so called "objectprint" or "faceprint". These prints are then used as a basis for comparison with data captured from an image retrieved from the mobile communications device 14, 16.

In some embodiments, the messaging computer system 12 is adapted to apply other types of item or object recognition modules using image data in a similar manner. Examples of these modules include a weapon identification module and a vehicle identification module.

Methods aspects of the invention are now described. These methods aspects provide computer based methods for receiving information about an emergency situation. The methods are executed by at least one network-connected computer system having a processor and machine readable memory.

Figure 16:
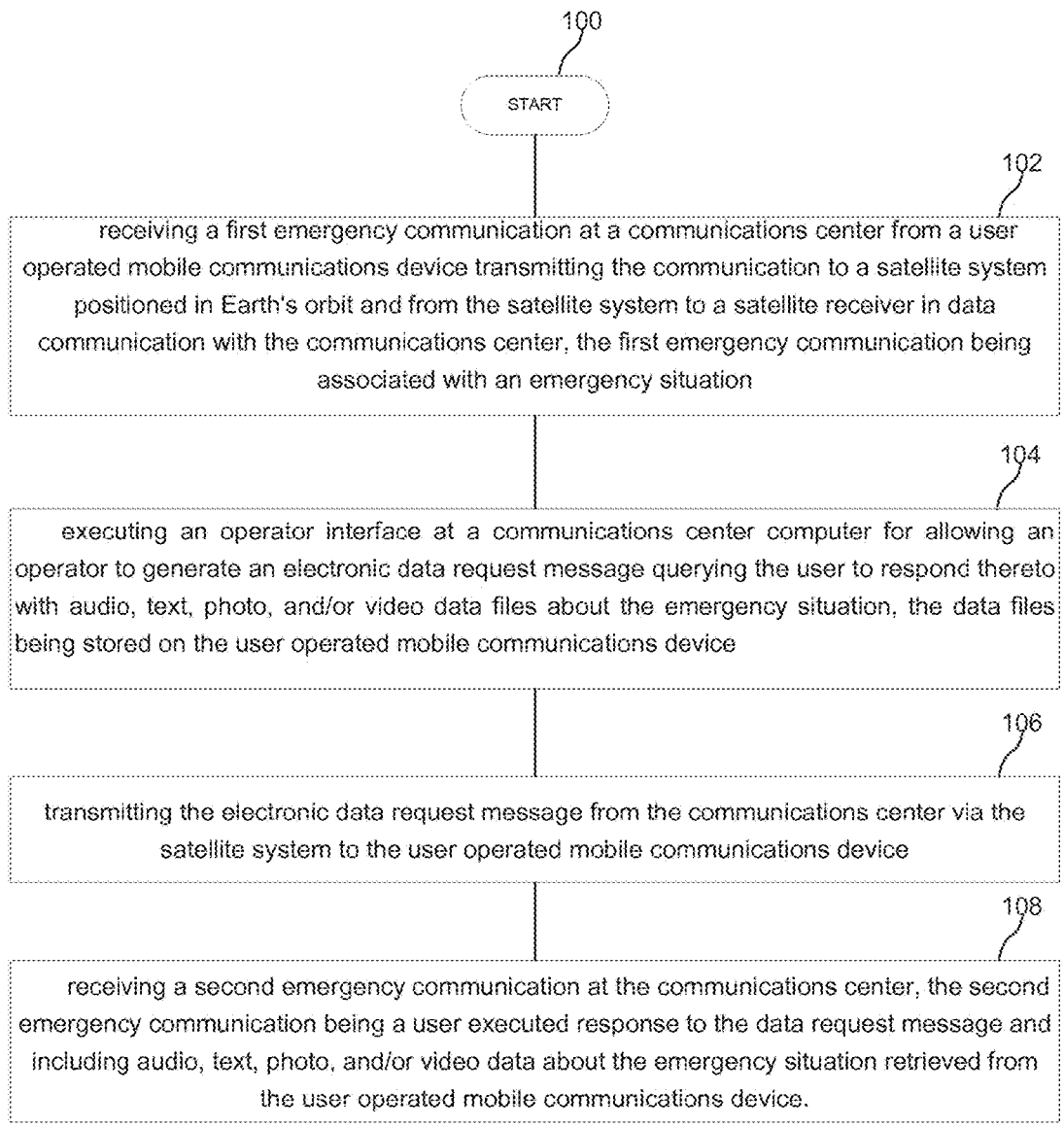
FIG. 16 flow diagrams illustrating method aspects associated with the system of FIGS. 12-15.

Referring to FIG. 16, a first method aspect of the invention begins at block 100. At block 102, the communications center receives a first emergency communication from a user operated mobile communications device transmitting the communication to an Internet connected network or satellite system (such as a satellite positioned in Earth's orbit and from the satellite system to a satellite or other receiver) in data communication with the communications center. The first emergency communication is associated with an emergency situation and may be in the form of a call, SMS message, MMS message, data file, or the like reporting information about the emergency situation.

At block 104, the messaging computer system executes an operator interface at a communications center computer for allowing the operator to generate the electronic data request message, which queries the user to respond thereto with audio, text, photographic, and/or video, and/or data files about the emergency situation. These data files are typically stored on the memory of the user operated mobile communications device.

At block 106, the electronic data request message is transmitted from the communications center via the satellite to the user operated mobile communications device.

At block 108, the communications center receives a second emergency communication, which is a user executed response to the data request message and includes audio, text, photographic, and/or video data about the emergency situation retrieved from the user executed mobile communications device.

Figure 17:
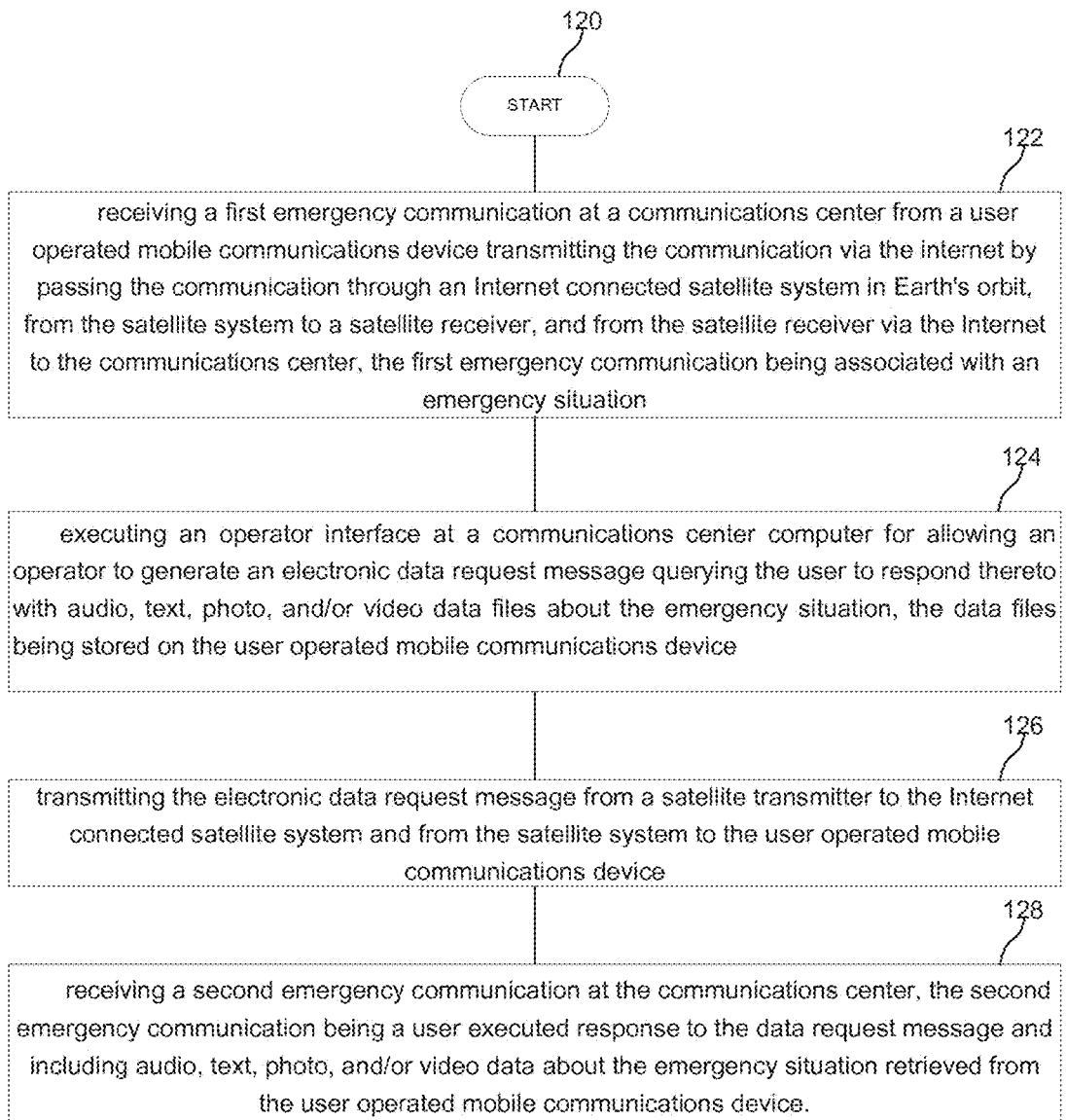
FIG. 17 flow diagrams illustrating method aspects associated with the system of FIGS. 12-15.

Referring to FIG. 17, a second method aspect of the invention begins at block 120. At block 122, the communications center receives a first emergency communication at a communications center from a user operated mobile communications device transmitting the communication via the Internet by passing the communication through an Internet connected network or satellite system in Earth's orbit, from the satellite system to a satellite receiver, and from the satellite receiver via the Internet to the communications center. As with the embodiment of FIG. 14, the first emergency communication is associated with an emergency situation and may be in the form of a call, SMS, MMS message, or the like.

At block 124, the messaging computer system executes an operator interface at a communications center computer for allowing the operator to generate the electronic data request message, which queries the user to respond thereto with audio, text, photographic, and/or video, and/or data files about the emergency situation. Again, these data files are typically stored on the memory of the user operated mobile communications device.

At block 126, the electronic data request message is transmitted from the Internet connected network or satellite transmitter to the Internet connected satellite system and from the Internet connected network or satellite system to the user operated mobile communications device.

At block 128, the communications center receives a second emergency communication, which is a user executed response to the data request message and includes audio, text, photographic, and/or video and/or data files about the emergency situation retrieved from the user executed mobile communications device.

Either of the methods of FIGS. 16 and 17 may include additional steps. For example, the messaging computer system may apply the object and facial recognition module 88 to compare images of faces in the photographic and or video data files to the images in the facial recognition database for identifying a match between a face in the photographic data and facial feature data of a pre identified person on the database.

The method may also involve dispatching the received audio, text, photo, and/or video, and/or data files about the emergency situation to a receiver operated mobile communications device. This is achieved by the communications center 18, as previously described. In some cases, however, the step of dispatching the received audio, text, photo, and/or video, and/or data files about the emergency situation to a receiver operated mobile communications device involves generating an electronic report about the emergency situation and displaying the electronic report and the received audio, text, photo, and/or video, and/or data files at a mobile data terminal operated by an emergency responder. In this manner the system 10 is configured to work in concert with conventional Computer Aided Dispatch (CAD) technology, which is used by many emergency responders.

In other embodiments, the Internet server 26 receives communications from emergency related websites and social media sites. These communications include, but are not limited to severe weather alerts, missing person alerts, or other emergency alerts. These communications may be transmitted from the messaging computer system to a receiver 16.

The communications center 18 and the interface 42 may be adapted for use by particular entities. For example, if the communications center 18 is a 911 communications call center, the interface may be adapted to show the phone numbers of the local police or fire departments, for example.

The messaging server database 24 stores data from every electronic message it receives. These data are accessible via the Internet server 26 to the interface 42. This allows a communications center 18 operator to search the messaging server database 24 for audio logs, photographs, videos, text, or phone numbers by typing the search terms into a search field. Suitable search fields include phone number, date, time, channel, comments, identification, and message text, among others.

Additionally, the audit trail of the MMS data is readily available with the use of the NexGen RID Network in combination with the NexGen Phone App.

As will be discussed later, the pervasiveness of the key tools (MMS enabled devices) to exchange multimedia data during an emergency response situation add new time sensitive dimension to emergency response situations. Having a caller wait in a phone line while emailing an image attachment is a step backwards for MMS enabled cell phone users.

Unfortunately, though, today finding a PSAP that is MMS enabled presents a first big challenge to callers who may have an image or video of a crime. The NexGen Phone App helps users connect with PSAP and TCC centers with MMS capability so that the MMS data can be received, identified, and properly distributed in a timely manner.

Further, coordinating effective multimedia usage with different end users from different agencies using different devices and having differing roles and differing access levels can be a critical resource management nightmare. The NexGen Phone App helps users select from a variety of exemplary Use Cases and have a hardware/software solution crafted to the user's specific Use Case needs.

It is understood the elements of each above embodiments of the can be used in the other embodiment as applicable.

Use Cases Overview—Applying the NexGen ESInet RID Network and the 911 Companion Cell Phone App The NexGen Global Technologies (NexGen) ESInet (Emergency Services IP Network) with its server side web application and server side paired cell phone app will work in conjunction with each other. There will also be two versions of the 911 Companion cell phone app. One version will be for the general public, while the second version will be made available for First Responders and will have functionalities in support of the duties that First Responders perform.

When a 911 call or text is placed from a cell phone that has the 911 Companion cell phone app installed, the cell phone app will activate. The 911 call or text can also be placed directly from the 911 Companion cell phone app.

911 Companion will store, in an encrypted file on the cell phone, the cell phone owner's personal information such as medical information and other pertinent information that needs to be conveyed during an with 911 during an emergency.

When used in conjunction with the NexGen web application, the cell phone users information stored in an encrypted file in the 911 Companion cell phone app will be displayed at the 911 Communication Center in the NexGen application if the user grants the 911 Companion app permission to release the information.

When used as a stand along solution (not in conjunction with the NexGen web application), the 911 Companion cell phone app will determine the jurisdictional PSAP (Public Service Answering Point) or 911 Center that is handling the communication with the 911 Center that the user's contact was connected to. Once that determination is made, an encrypted file will be sent via email to the appropriate 911 Center. All 911 Centers will be contacted prior to launching 911 Companion to provide the PSAP with the key to unencrypt any encrypted 911 Companion files they may.

Web Application Functionalities

The NexGen Server Side Web Application Allows for the Following Non-Limiting Exemplary Functionality with Respect to First Responders Adding/Changing/Deleting
Case Number
Incident Number
Unit Number (which equates to the radio number)
Users
Assigning Rights to a User Profile (Defines what access the user is granted)
Setting up
Setting up Departments Remote Control of Cell Phone Via Nexgen Web Application The 911 Companion app will, with the user's consent, allow the 911 Center personnel and First Responders grated the right to remotely control the functionalities of the user's cell phone that are listed below:

Distraction Noises/Sounds

NexGen ESInet server side services will allow 911 Center personnel to send distraction noises to a cell phone that has the 911 Companion cell phone app installed on it.

A distraction noise will be useful in the event of a home invasion, hostage situation or active shooter incident. The 911 Center personnel or SWAT will be able to emit a noise or sound from the NexGen ESInet server side application to a cell phone that has the 911 Companion app installed on it.

This is one of the many features that 911 Center personnel (or SWAT) will be able to control remotely on a cell phone that has the 911 Companion app installed on it.

QR Code Reader

The 911 Companion app will have the ability to read QR Codes. The QR Code will be made available in buildings and its core data will contain a link to emergency exit routes, emergency contact numbers, etc.

Camera

The 911 Companion app will, with the cell phone user's consent, allow 911 Center personnel and First Responders who are granted the rights the ability to access and remotely control the Camera of the user's cell phone that contacted 911 and has the 911 Companion app installed on it.

Microphone

The 911 Companion app will, with the cell phone user's consent, allow 911 Center personnel and First Responders who are granted the rights the ability to access and remotely control the Microphone of the user's cell phone that contacted 911 and has the 911 Companion app installed on it.

Speaker

The 911 Companion app will, with the cell phone user's consent, allow 911 Center personnel and First Responders who are granted the rights the ability to access and remotely control the Speaker of the user's cell phone that contacted 911 and has the 911 Companion app installed on it.

Clock

The 911 Companion app will, with the cell phone user's consent, allow 911 Center personnel and First Responders who are granted the rights the ability to access and remotely control the Clock of the user's cell phone that contacted 911 and has the 911 Companion app installed on it.

Battery Life

The 911 Companion app will, with the cell phone user's consent, allow 911 Center personnel and First Responders who are granted the rights the ability to access and remotely control the battery life of the user's cell phone that contacted 911 and has the 911 Companion app installed on it. By having this control, the 911 Center personnel will be able to shut down services on the phone in order to extend the life of the battery.

Sensors—Internal/External

The 911 Companion app will, with the cell phone user's consent, allow 911 Center personnel and First Responders who are granted the rights the ability to access and remotely control the internal or external Sensors of the user's cell phone that contacted 911 and has the 911 Companion app installed on it. The remote control access will also allow for extracting the data readings from the associated Sensors.

Setup Profiles

The 911 Companion app will require users, both individuals and First Responders, to complete their profiles immediately after installing the 911 Companion app. For First Responders, the Profile will require ad authorization code issued to the agency that the First Responder works for.

Accelerate Phones Temperature

The 911 Companion app will, with the cell phone user's consent, allow 911 Center personnel and First Responders (such as SWAT) who are granted the rights the ability to access and remotely control the user's cell phone and trigger an excessive amount of services on the cell phone. This will be done in order to raise the temperature of the cell phone. It has been proven that when a cell phone battery achieves an excessive temperature that the batteries can and do have the tendency to undergo a physically observable reaction (such via audible or visual emissions). This functionality can be used to cause a distraction when SWAT is about to breach a location.

Live Video Stream

The NexGen 911 Companion app will allow for having the mobile device that has the cell phone app installed the ability to be able to point, shoot, and stream live video feeds directly to the ESInet servers, then on to the PSAP, MDT and/or First Responder's or Citizen's cell phone app.

NexGen ESInet application.

SMS/MMS/Photos/Video

The 911 Companion app will have the ability to send and receive photos, video clips and text in addition to perform live video streaming from the NexGen 911 Companion app itself to the NexGen web application.

Object Recognition

Once the PSAP personnel receive a photo of a person or object, PSAP personnel will activate NexGen's object recognition functionality within the NexGen app or the ESInet server. The Object Recognition functionality on NexGen services will scour the internet and internal database of vehicles, persons, objects, etc. for images that match the object in the photo. Object Recognition will also attempt to read and display the license plates of any vehicles shown as an object.

Transmit Large Files

The NexGen apps will be capable of sending and receiving files of all sizes and types of formats.

For example, in an emergency situation the Special Weapons and Tactics team (SWAT) needs the floor plans of a building. The 911 Center personnel will be able to send the large file using NexGen's US911 short code over the wireless network and broadband. Even though the wireless networks are highly restricted as to the sizes and types of files it will accept. This large file transmission will be accomplished by NexGen ESInet RID Network services first storing the large, format restricted files on the NexGen ESInet servers. The NexGen apps will then create a short link and send the link to the file location to the devices of SWAT, news media and First Responders instead of the file itself. Once the link is received by SWAT, they will be able to download the file onto their device. Since only a link is being sent, as opposed to the file itself, then the transmission time will be much less than attempting to send the file itself. The transfer capability will be 1,000 messages a second.

The 911 Companion app will have the ability to transfer large files to the NexGen ESInet services server directly from the cell phone app over a data connection.

Push Notifications

The paired NexGen apps will allow for the NexGen ESInet server side services to send real time push notifications to the 911 Companion app.

Distress Button

The 911 Companion app will have a Distress Button that when pressed, or activated by a verbal command by the cell phone user, will automatically connect the cell phone or other communications device to 911. If during the setup process of the app, the users grants the app the permission to automatically send the user's profile data to 911 when the Distress Button is activated, then the users encrypted profile data will be automatically sent to 911.

Silent Button

The 911 Companion app will have a Silent Button that, when pressed or activated by a verbal command, or when 911 is contacted by the cell phone user, will automatically silence the ringer on the cell phone. This functionality will allow for the user to not be concerned with the cell phone ringing during an emergency. Especially if the user is at a location with an Active Shooter or a Home Invasion.

CATV And Traffic Cams

PSAP personnel receive a communication (call or text) about a vehicle that fled the scene of a hit and run or robbery, etc. The PSAP personnel will be able to access and display the CATV video feeds, specifying a radius, of all the CATV feeds within the specified radius. The NexGen app will then display all the live CATV feeds. Using its Object Recognition module, NexGen services will attempt to identify the vehicle, then track the vehicle as it moves from CATV to CATV.

Magnetic Card Reader

Using a magnetic card square (type) reader attached to a cell phone, the NexGen 911 Companion cell phone app will be able to read the data from a government issued ID card, driver's license, collage or corporate issued ID card, etc.

The data retrieved via the scan referenced above will then be checked against numerous data bases, such as NCIC (National Crime Information Computer) for Wants/Warrants, the Department of Motor Vehicles, the internet and other public data bases such as Spokeo, Been Verified, etc. Any data matches will be returned and displayed in the NexGen apps and returned directly to the authorized 911 Companion app that submitted the request.

DNA Detection and Measurement

Using a Fluorescence Microscopy device adapted to a cell phone or other mobile device, a First Responder will be able to take a DNA sample that will be sent to the NexGen ESInet application services where the DNA captured and analyzed can be matched against DNA databases such as LODIS (Local DNA Index System) and simultaneously sent to CODIS (Combined DNA Index System), the FBI's DNA database. In the event a match is made, the results will then be sent back to the submitting agency.

License Plate Reader

Using the NexGen 911 Companion cell phone app, the user will be able to point the app at the license plate of a vehicle and the NexGen app will take a picture or provide a live video fee of the license plate and the NexGen server side service will read the license plate and translate it to a text version of the plate number and also provide the location of the cell phone providing the information.

Instructional Videos

The NexGen ESInet servers will house instructional videos such as medial how to videos. When a medial situation occurs and 911 is contacted, the 911 Center personnel will be able to send a simple text link (in the form of a short address) to the individual's cell phone who contacted 911. The individual who contacted 911 will then be able to access the instructional video on their cell phone by clicking on the link they received from the 911 Center personnel.

In the event that the individual contacting 911 has the 911 Companion cell phone app installed on the cell phone they using to contact 911, they will have access, directly from the 911 Companion cell phone app, to any of the instructional videos housed on the NexGen ESInet servers.

Tattoo and Tagging (Grafitti) Scan and Identification

The 911 Companion app will have the ability to photograph a Tattoo a or Tags (street graffiti) and check against a database of offender Tattoos and Tags for a match in real-time. This will benefit Police Gang Units as this functionality will allow Police Gang Unit to obtain intelligence information about Tattoos and Tags in real-time say during a felony stop or apprehension.

Biosensing

The NexGen app will receive notifications from both fixed biosensors and biosensors attached to a cell phones that has the 911 Companion First Responder version app installed. Once the NexGen server side application receives data from a bio sensor, the NexGen app (both web and mobile device) will identify exactly what triggered the sensor such as triggering events related to data about chemical activity/results, finger prints, gun shots, explosions, heart rate, etc. The NexGen app working in conjunction with NexGen server side application, will seek to identify exactly what triggered the sensor and provide any relevant location data.

Body Camera

The NexGen ESInet services application and 911 Companion First Responder version (Android, iOS, etc.) of the cell phone app will interface with law enforcement body cameras streaming a live video feed.

A First Responders body camera activates and the NexGen apps will receive notification of the activation. The personnel at the Public Service Answering Point (PSAP) or 911 Center will be able to activate a live stream from the body camera to NexGen's apps at the communications center. The live video stream protocol can also be set to automatically stream the live video. The personnel will also be able to forward the live video stream to First Responders being dispatched to the location of the incident.

The above referenced Use Case will require integration with the body camera.

Data Tagging for Clearance

When information is received by the NexGen web application, NexGen services will attempt to tag the data received with a security clearance level. These security clearance levels will be associated directly with which individuals in an organization will be able to access the tagged information. This protocol may also be a manual process.

The alternative will be that the 911 Center personnel will appropriately tag the data.

Sight/Location Identification

When the photo of a location is received by the NexGen ESInet services it will scour the internet to determine if the photo can be matched to the actual location.

Pawnshop Data

The NexGen 911 Companion cell phone app will be able to view an object, such as a piece of jewelry, bicycle, tools, anything with a serial number, etc. and check against the Law Enforcement Training Technology and Research FINDER pawnshop database. This object recognition check will be to see if the property can be identified and if so pull the associated data of who previously pawned an item.

Scrap Metal Data

The NexGen 911 Companion cell phone app will be able to check against the Law Enforcement Training Technology and Research Scrap Metal database to determine if an individual stopped and found with scrap metal in his/her possession has previously scrapped metals and if so at and which Scrap Metal yards.

Eye Scan

Using the NexGen 911 Companion cell phone app, the user, as long as their retina scan is registered, will be able to perform an eye scan in order to be granted access to secure data.

Atmospheric Sensor Alerts—Automated

When the NexGen server side services application receives an automated alert regarding a tsunami, tornado, hurricane, red flag (or any of the approximately 21 severe atmospheric) warnings from NOAA (National Oceanic and Atmospheric Administration, the NexGen app will automatically send automated alerts to First Responders and registered users.

These automated atmospheric related alerts will be sent via NexGen's US911 registered short code at a rate of 3,000 messages per second. These alerts will also be sent out via the integration of NexGen's platform with the Computer Aided Dispatch (CAD) applications used at all PSAPs.

Electronic Warrants

From the NexGen app, electronic warrants can be requested via an electronic warrant service and received directly on the mobile device or cell phone apps of the appropriate personnel that will be serving the warrant.

Electronic Bills Boards

The NexGen ESInet services application or the 911 Companion First Responder version app will have the ability to remotely post messages on the DOT (Department of Traffic) and company owned or privately owned electronic billboards. Once the billboards can handle photos and videos, the NexGen applications, properly integrated, will also be able to post photos and/or videos to the electronic billboard signs locally and along the nations' highways.

These combined processes will allow for the posting of missing children and seniors, etc., in a fast and efficient manner.

Suspicious Behavior Identification

The NexGen ESInet server side services will be able to view a live video stream from CATV or the 911 Companion First Responder version of the cell phone app and determine if an individual is acting in a suspicious manner, identified by their movements.

Real Time Incident Stitching

The NexGen ESInet server side services will be able to pull all types of data (i.e., text, video, photos, calls, etc.) by time line and switch the data together by timeline.

Telematics

The NexGen 911 Companion app will provide the location of the cell phone or mobile device. Say if an individual sends a text to or calls 911 in an emergency situation, the 911 Companion app will send the location of the cell phone or mobile device to the NexGen web application. The 911 Companion app will also provide the individual with an option to release the personal and medical information stored as an encrypted file in the app housed on the cell phone or mobile device. When the individual approves (or preapproves during the setup process) the release of their personal information when 911 is contacted from the mobile device housing the cell phone app, the information will then be streamed to the NexGen web application and displayed for the 911 Communications Center personnel to see.

Social Media

Once a photo of and individual is received in the NexGen web application, the NexGen Object Recognition module will scour the social media sites (and the internet itself) for a match to the photo of the individual identified.

Location Where Picture Taken

NexGen ESInet server side services will allow 911 Center personnel to obtain the location where a picture or video was taken.

Drone Video Feed

When a drone, integrated into the ESInet server services, begins a live video feed, the feed will be fed directly into the NexGen app. The feed will be transmitted via the existing wireless carrier network directly into the NexGen application and can be viewed from anywhere in the world where that the application has connectivity to the internet by anyone with authorized access.

EFIC Data

The NexGen web application services will read and extract the EFIC (Exchangeable Image File Format) data from photos received by the NexGen apps (both cell phone and web). This data, if captured by the photo, will provide important information such as the date and time when the photo was taken. The location provided as X-Y coordinates will be translated to a physical address.

Figure 18:
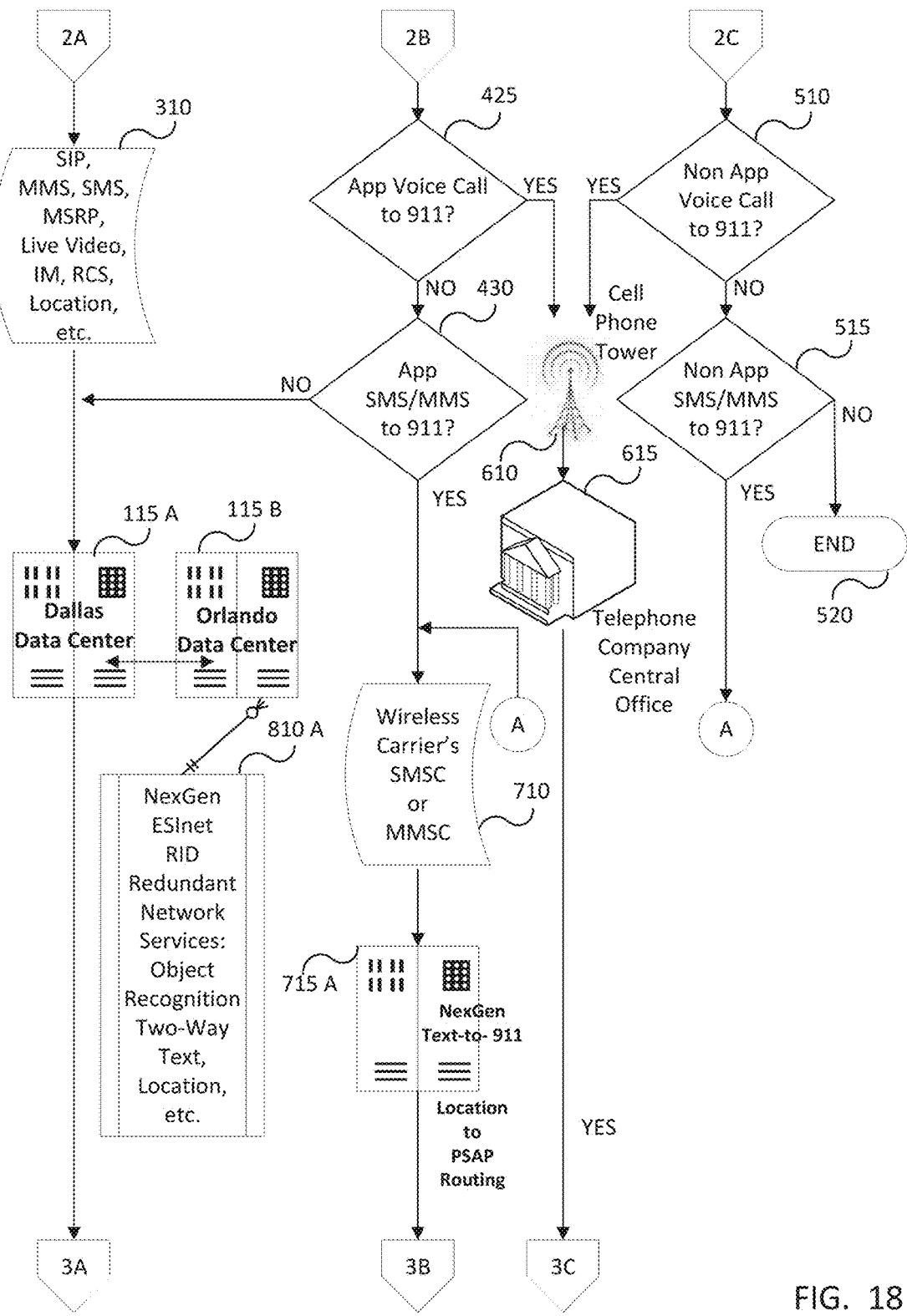
FIG. 18 illustrates the NexGen Text-to-911 Location to PSAP server has direct connectivity to the wireless carrier 911 network.
Figure 19:
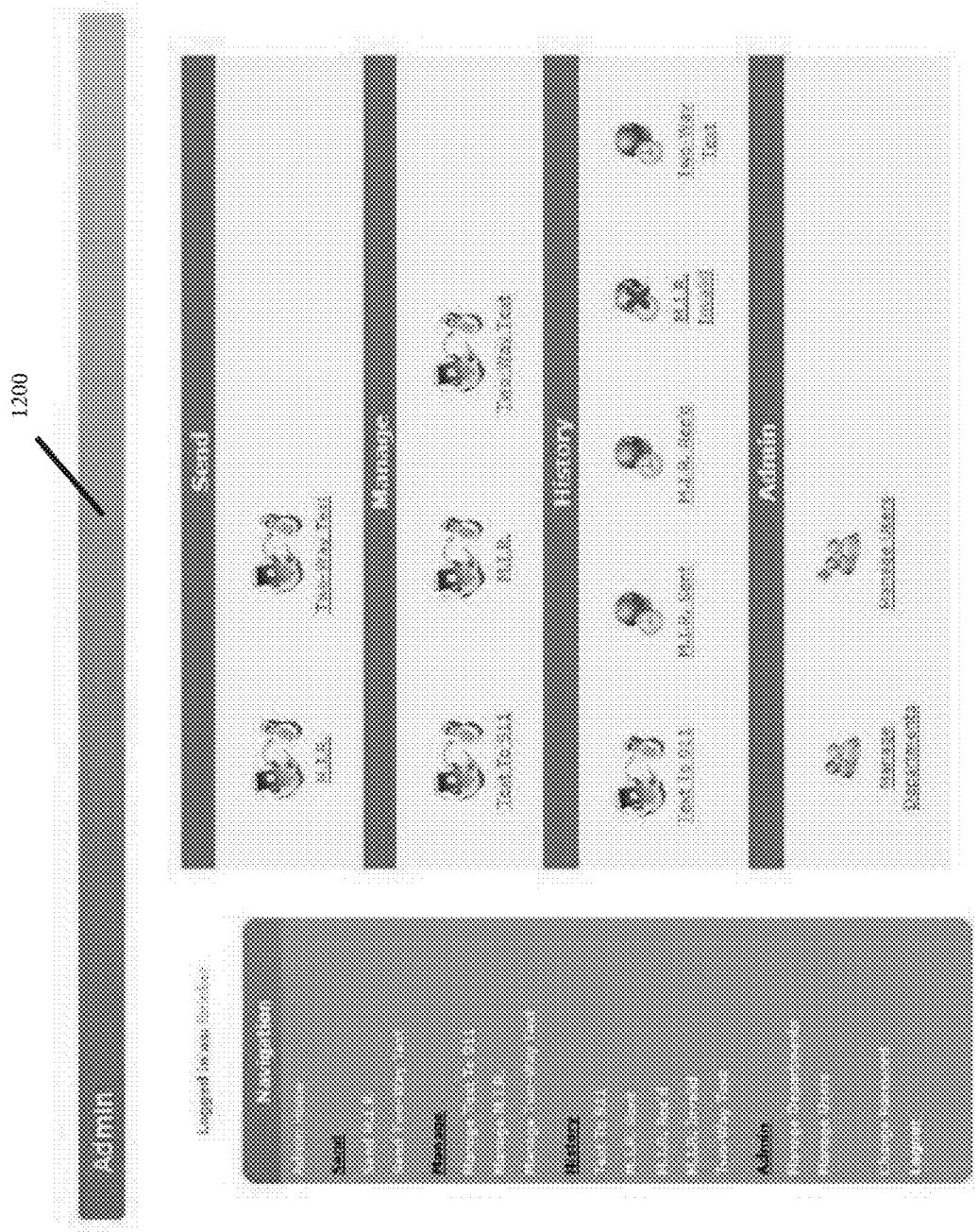
FIG. 19 presents the Admin Home screen.
Figure 20:
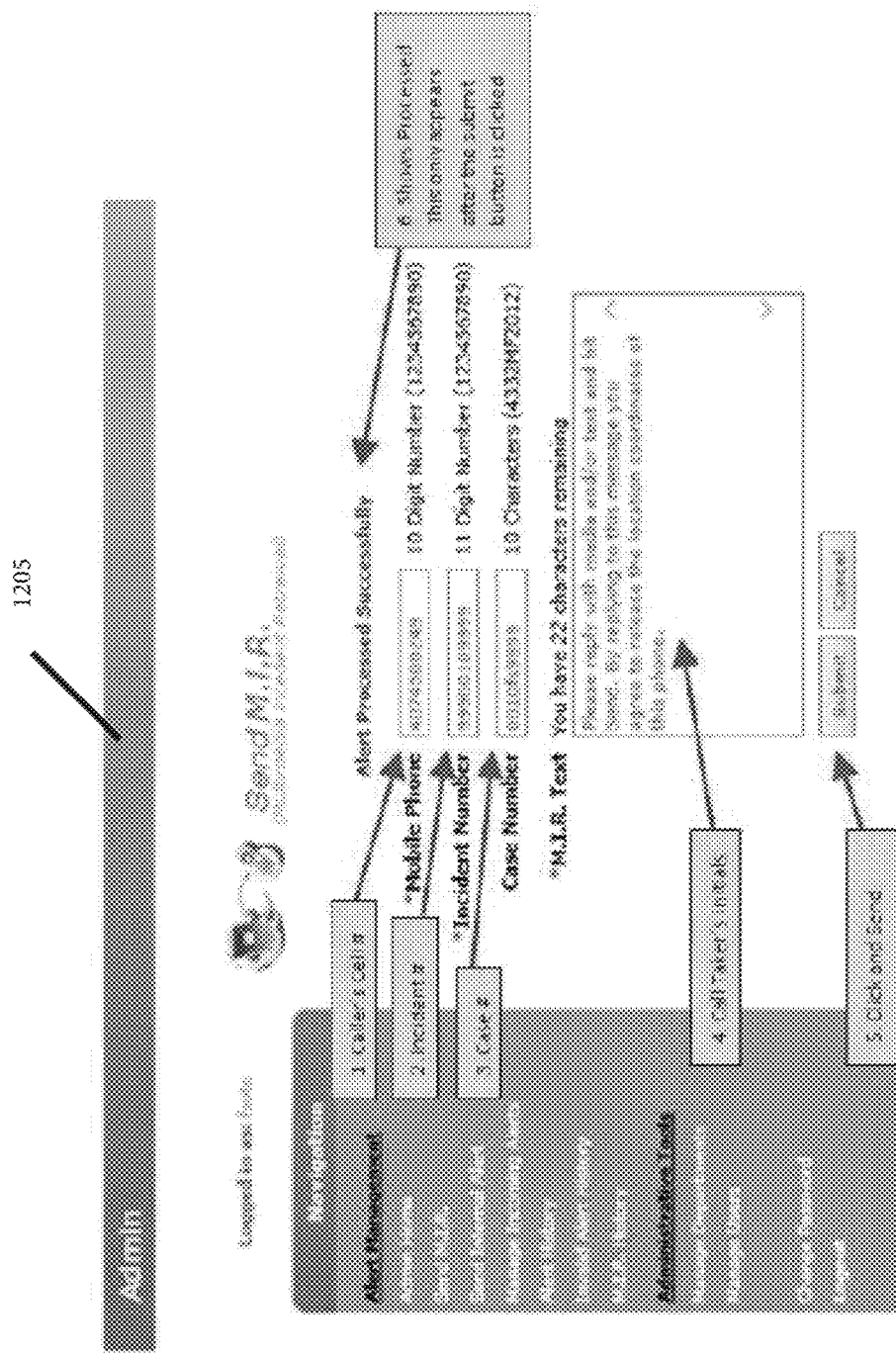
FIG. 20 presents the M.I.R screen.
Figure 20A:
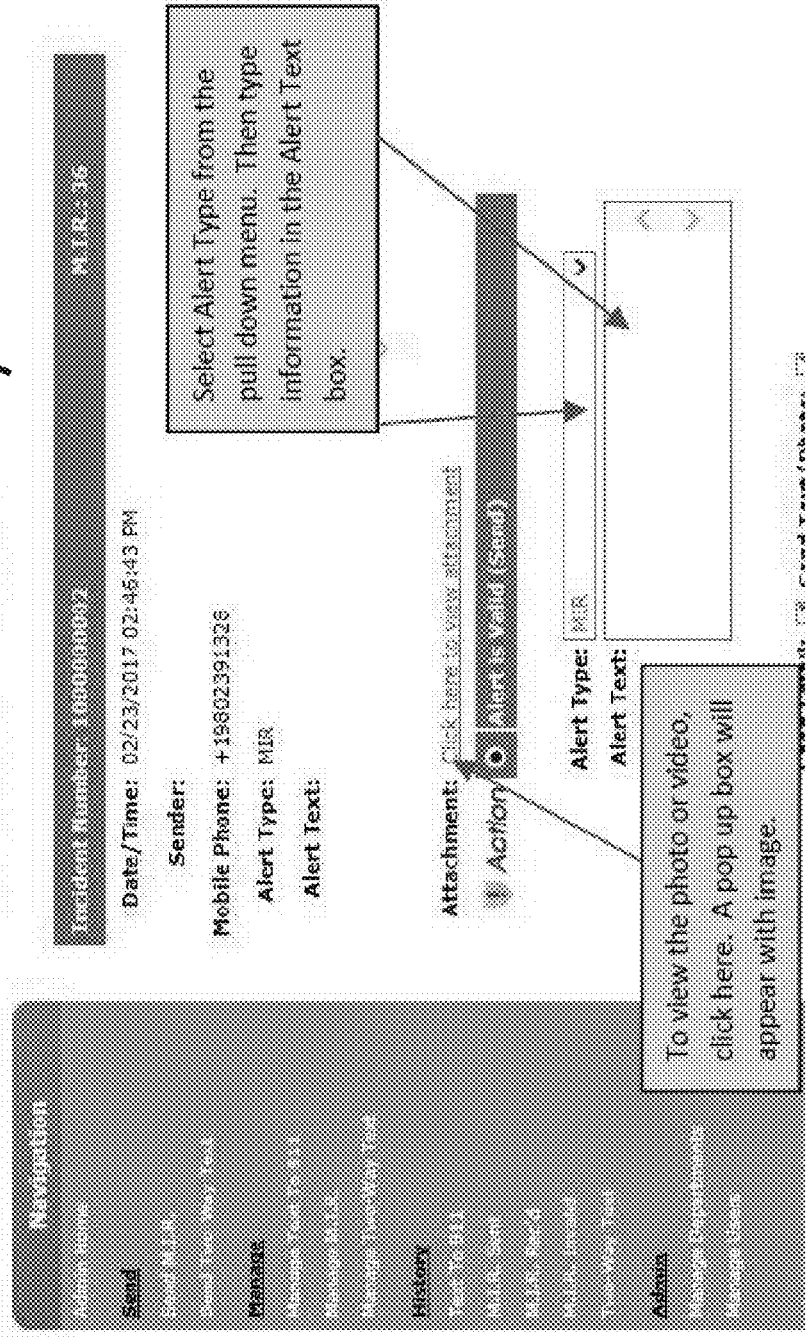
FIG. 20A presents the "Manage Incoming Alert" Screen.
Figure 21:
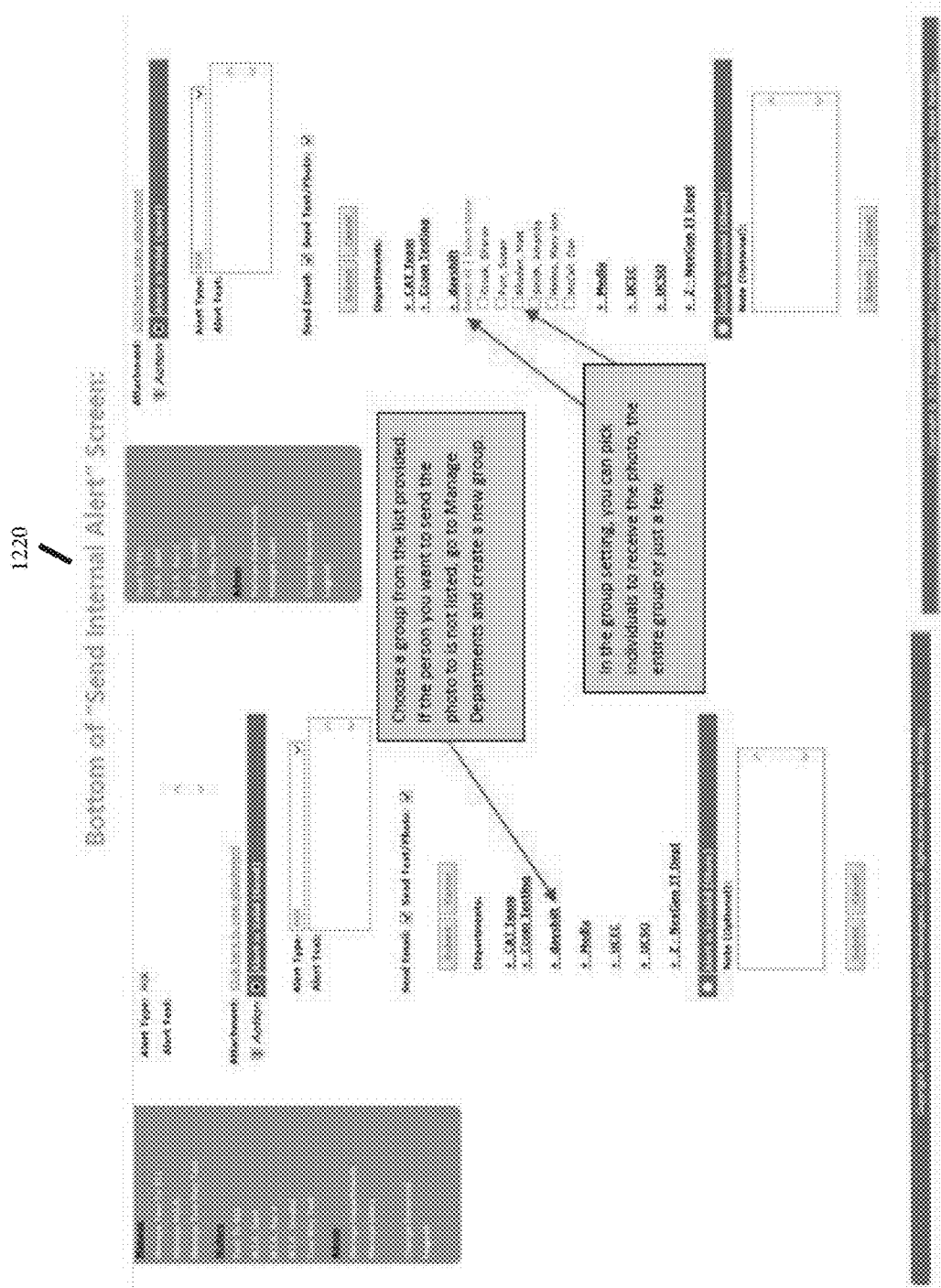
FIG. 21 presents the "Send M.I.R. Alert" Screen.
Figure 22:
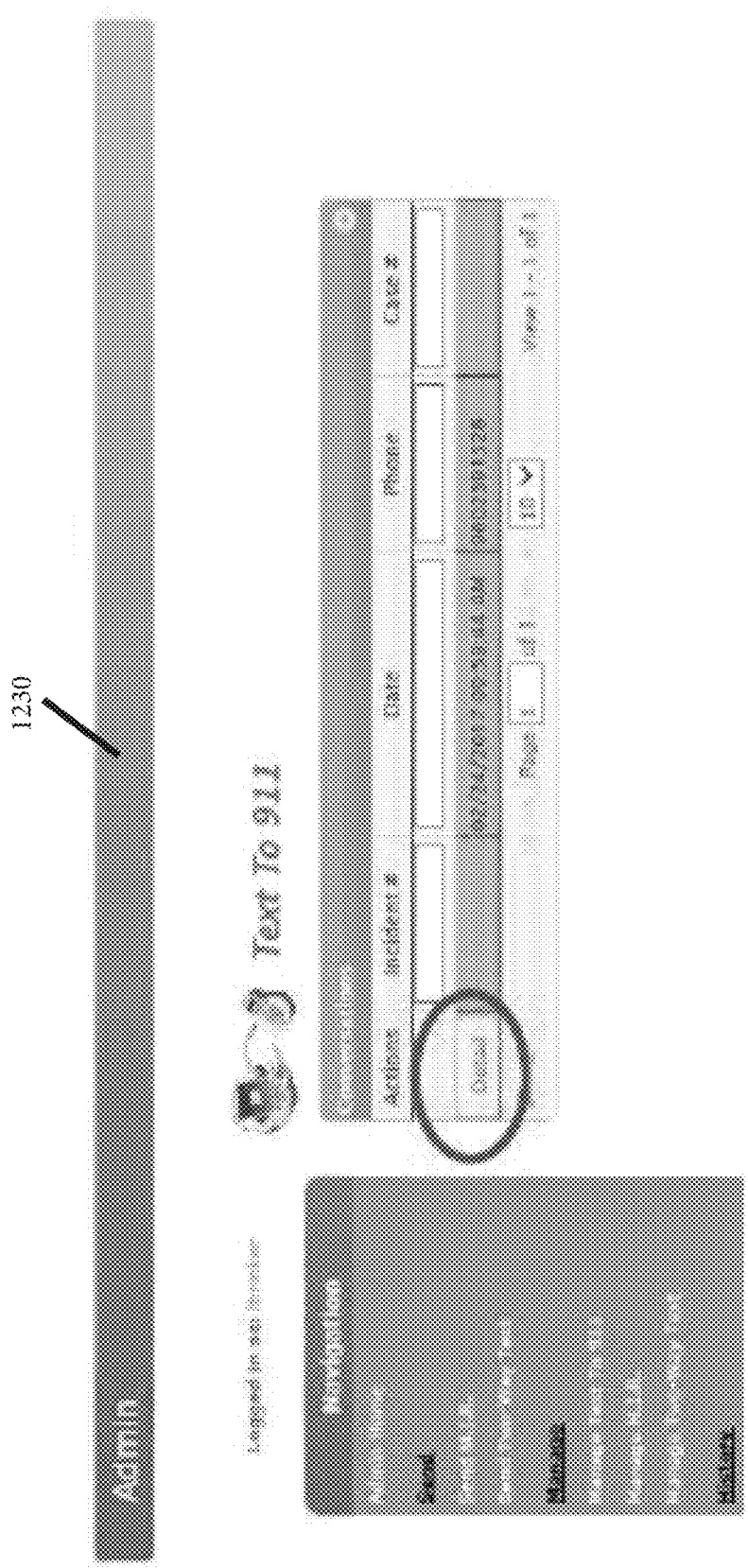
FIG. 22 presents the "Manage Text To 911 Alerts" Screen.
Figure 23:
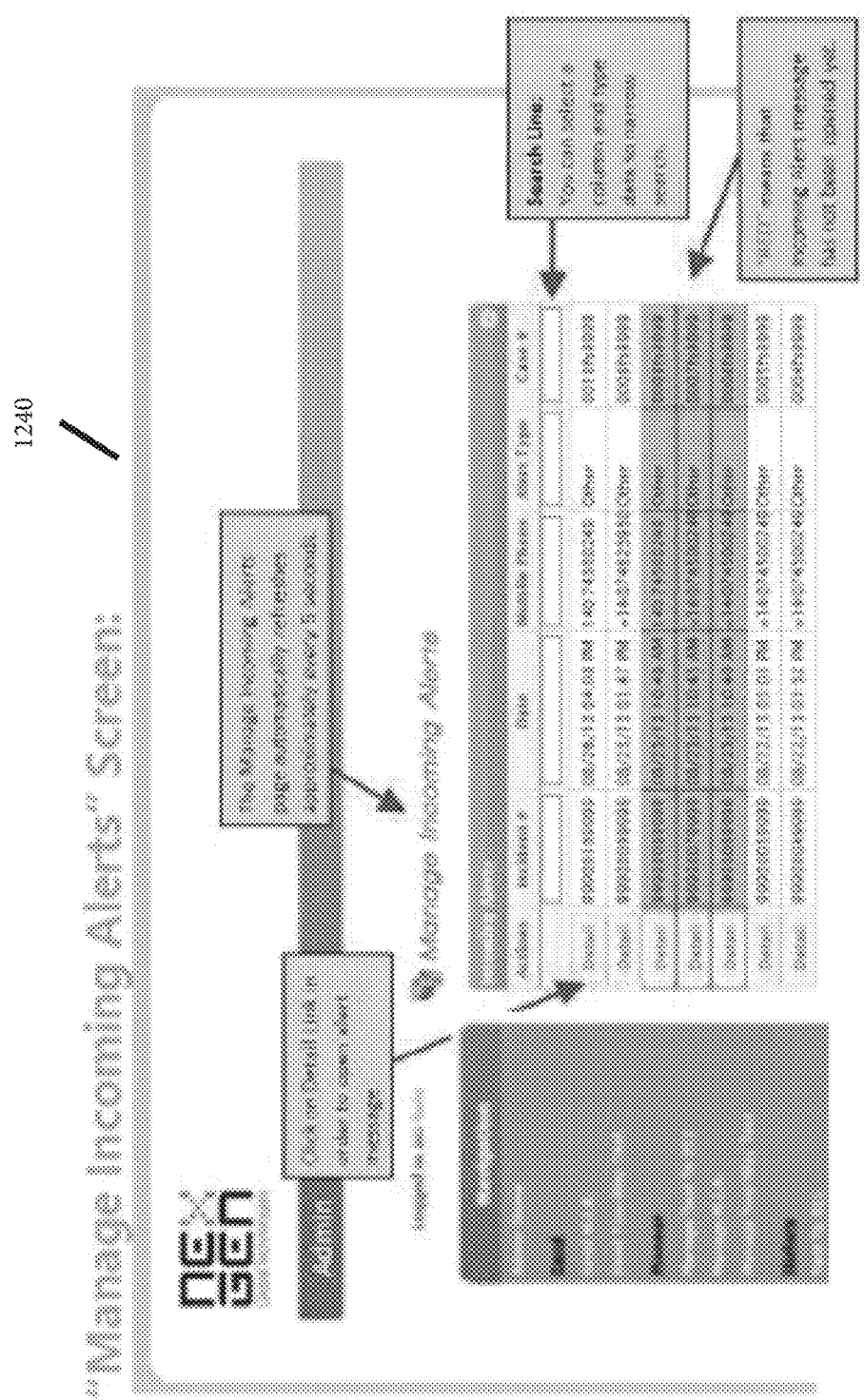
FIG. 23 presents a "Manage Incoming Alerts" Screen.
Figure 24:
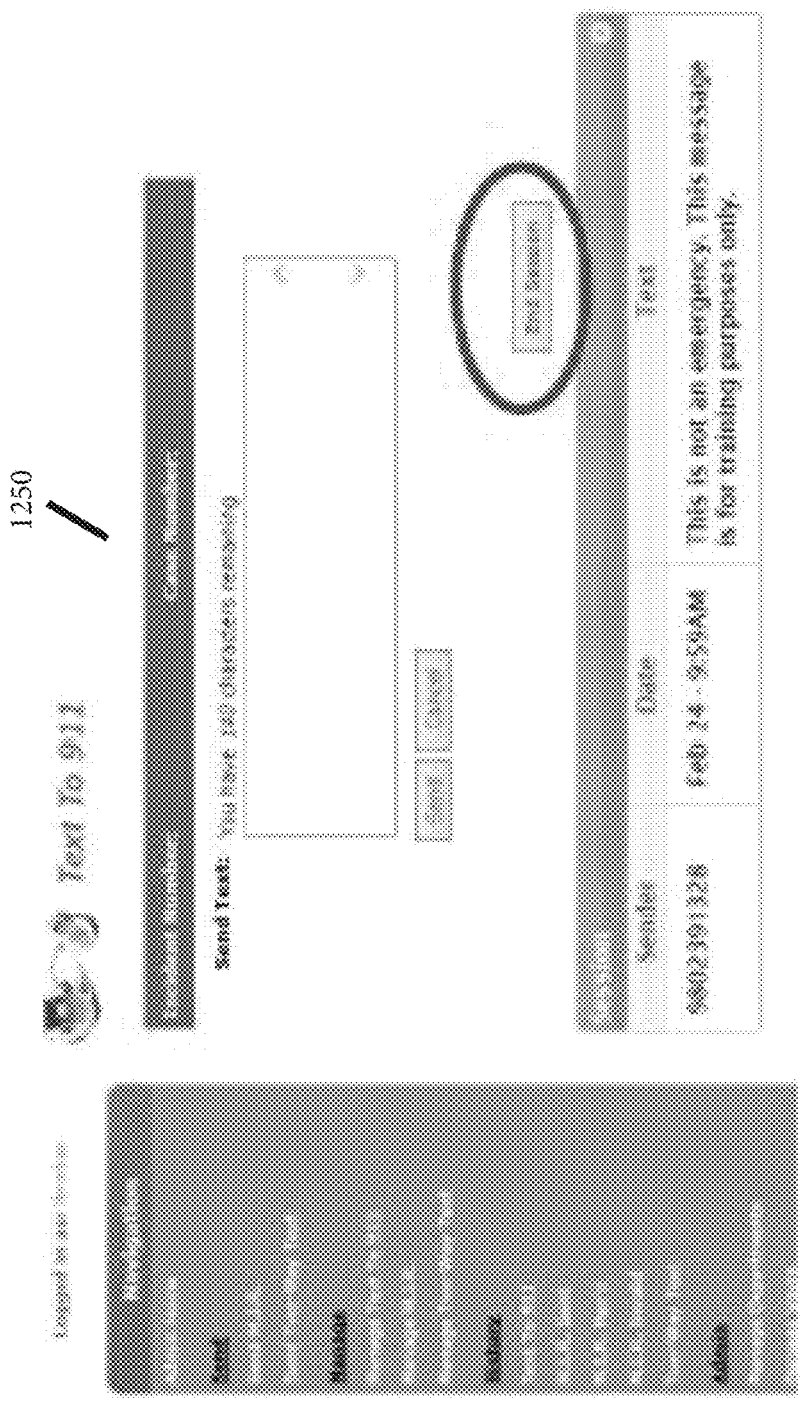
FIG. 24 presents text to 911 screen.
Figure 25:
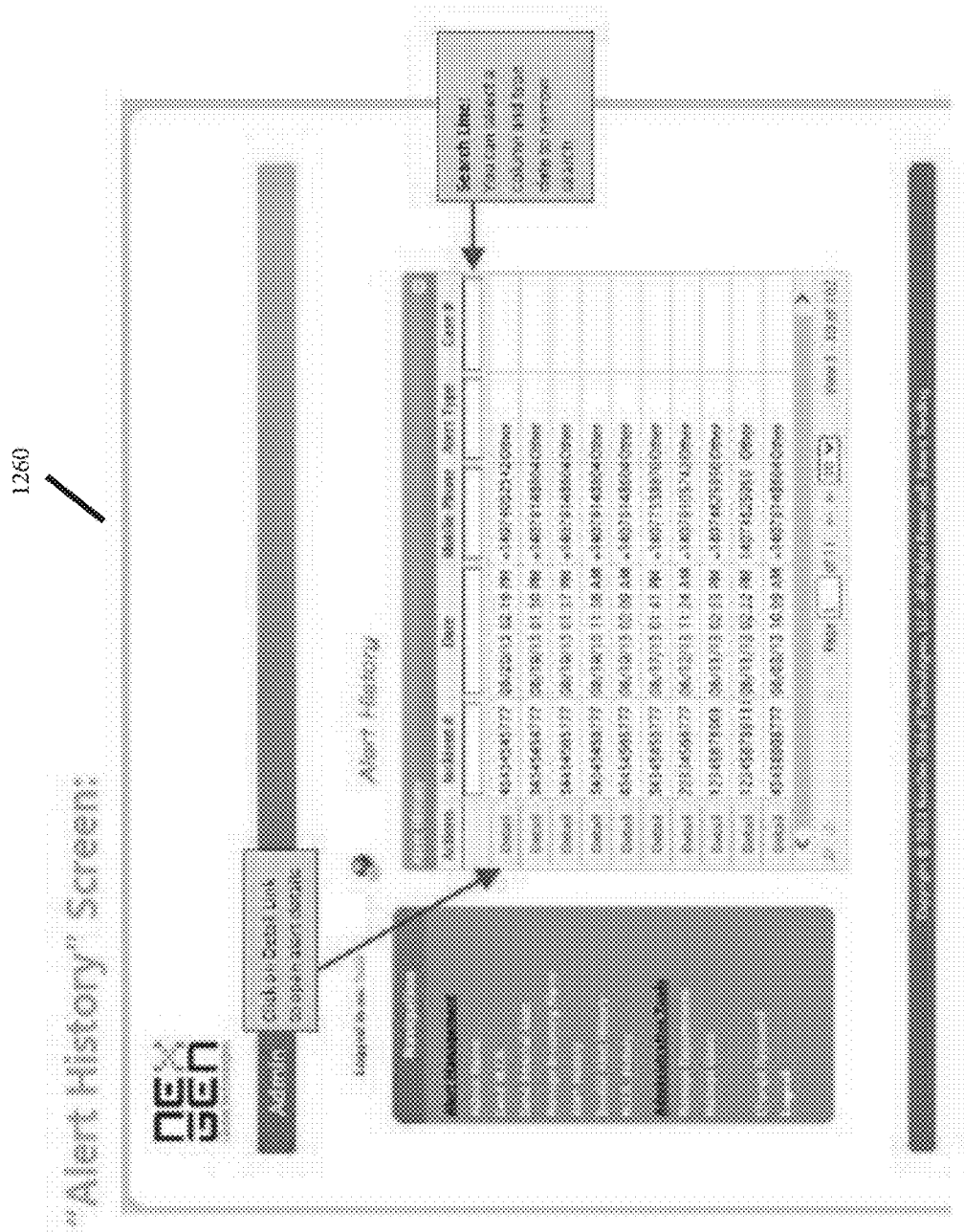
FIG. 25 presents an "Alert History" Screen.
Figure 26:
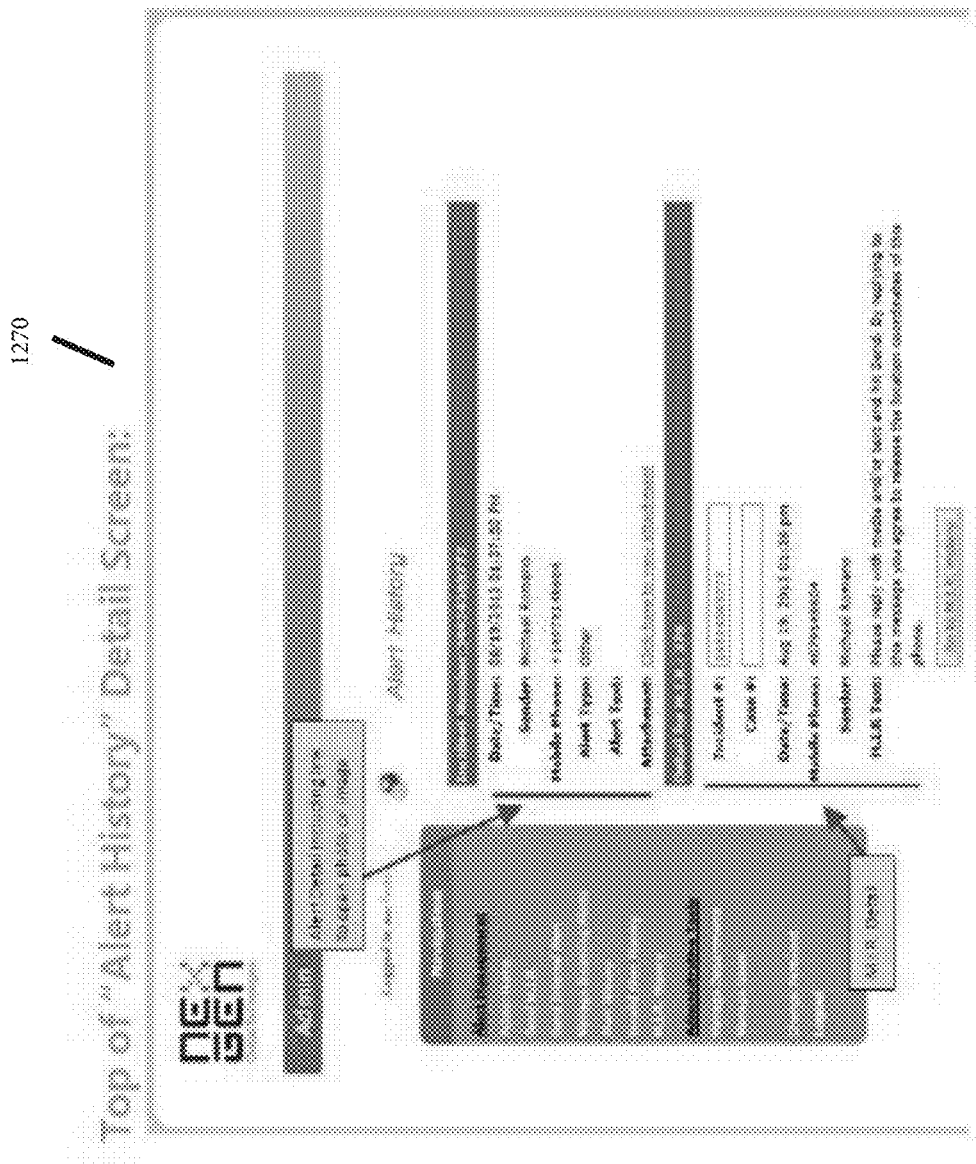
FIG. 26 presents the "Alert History" Detail Screen.
Figure 27:
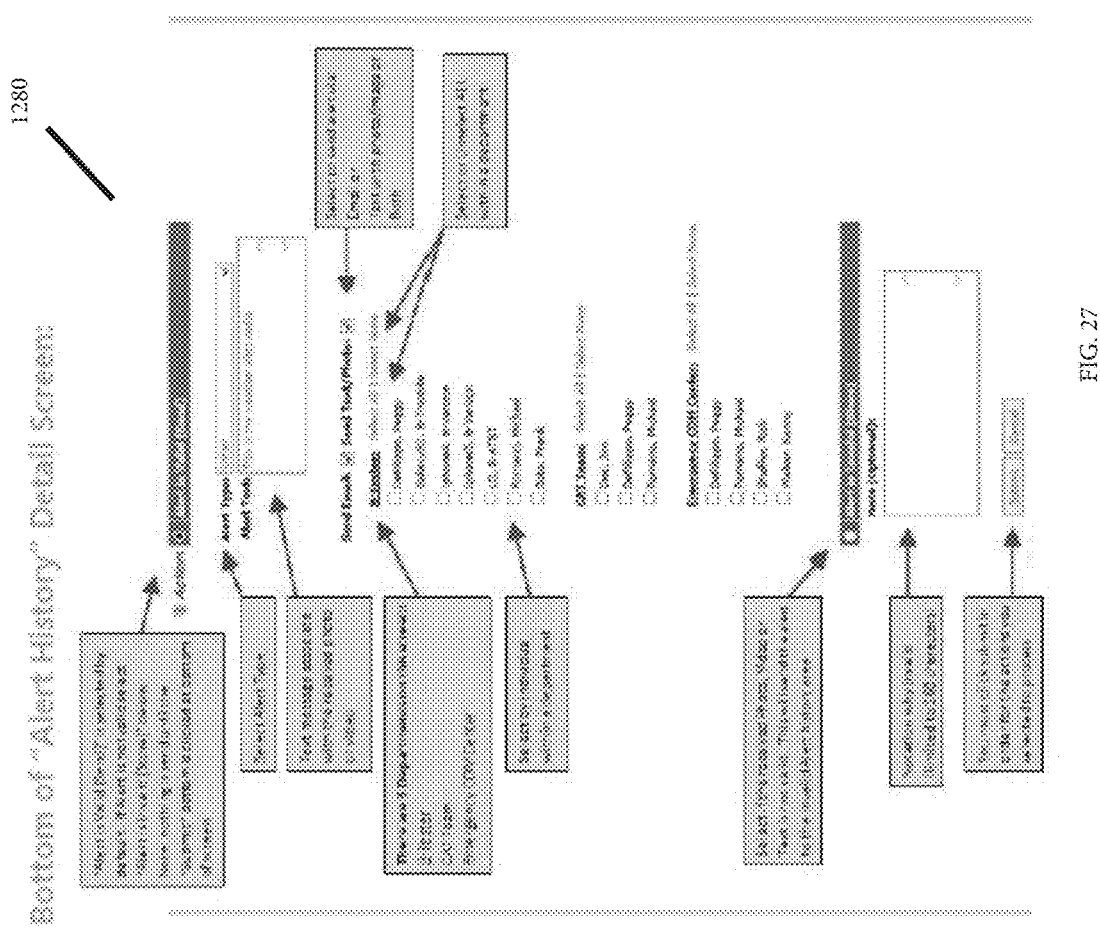
FIG. 27 presents an "Alert History" Detail Screen.

In an alternate embodiment, as show in at element 715A in FIG. 18, The NexGen Text-to-911 Location to PSAP (Public Service Answering Point) server has direct connectivity to the wireless carrier 911 network. Since the NexGen server is an IP broadband based server, this server as with all NexGen servers, has the ability to handle SMS (Short Message Service) and MMS (Multimedia Message Service). With NexGen's API (Application Program Interface) utilized by CAD (Computer Aided Dispatch) solution providers to integrate their CAD's directly into the NexGen network, NexGen is able to receive content from the wireless carrier network SMS/MMS directed to 911. The NexGen Text-to-911 Location to PSAP server will then determine the location of the PSAP that will handle the SMS/MMS session.

In replacing the Text Control Center (TCC) with the NexGen Text-to-911 Location to PSAP server, the PSAP can handle bi-directional text (SMS), photos and video clips (MMS) from cell phones. Because of limitations of the TCC it prohibits the PSAP from initiating a text to a cell phone unless it is in response to a Text-to-911 message. The TCC limitations also prohibit PSAPs from receiving or sending photos and video clips (MMS).

As shown in FIGS. 19-27, the MIRS (Multimedia Incident Response System) incorporating the systems and methods for dynamic distribution of multimedia and data files across an emergency response communications network of the instant invention allows 9-1-1 Communications Center personnel to send, receive, forward and retrieve photos, videos and text to/from cellular enabled mobile phones and devices. MIRS is an IP-cloud based system. It only requires Internet access and a simple web browser to access and use it. M.I.R. also works with all mobile phones and across all wireless carrier networks. It does not require a cell phone app or desktop application to be installed for the technology to work.

The functions available via the MIRS are provided thru the graphical user display which includes screens such as presents the Admin Home screen 1200, the send M.I.R screen 1205. the "Manage Incoming Alert" Screen 1206, the "Send M.I.R. Alert" Screen 1220, "Manage Text To 911 Alerts" Screen 1240, additional "Manage Incoming Alerts" Screen 1240, additional text to 911 screen 1250, an "Alert History" Screen 1260, "Alert History" Detail Screen 1270, additional "Alert History" Detail Screen 1280.

Figure 28:
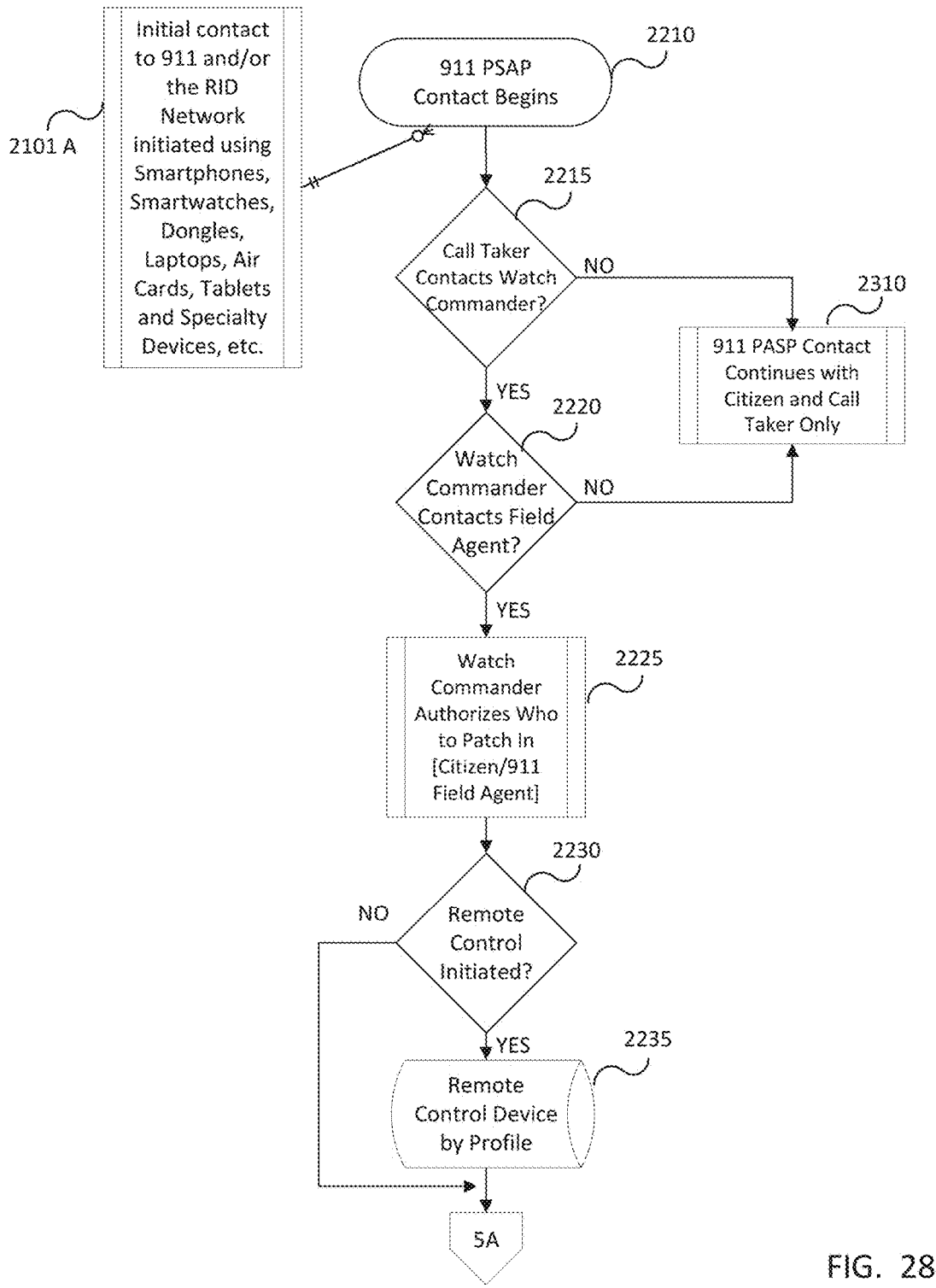
FIG. 28 is an embodiment flow chart showing the First Responder controlling the Citizen's communication device.
Figure 29:
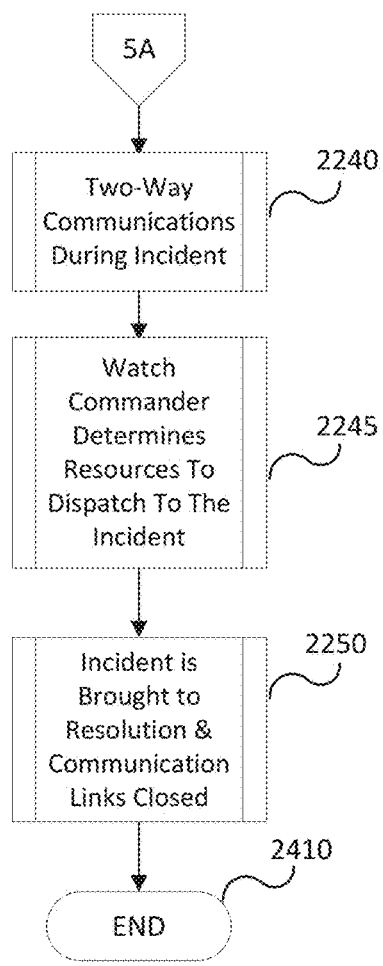
FIG. 29 is an embodiment flow chart showing the First Responder controlling the Citizen's communication device.

In an alternate embodiment as shown in FIGS. 28-29 and in the functions presented above, the instant invention can be configured as an emergency response communications method for exchanging information about an emergency situation, the method being executed by a network connected computer system having a processor and machine-readable memory, the method comprising:

providing at least one Citizen user device running a Citizen computer program application which communicates data selected from the group consisting of multimedia service/MMS, Short Message Service/SMS, Uniform Resource Locator/URL, Live Video, Location information, voice communications, communication signals, and device control signals with the network connected computer;

providing a first First Responder communications device for communicating through the network connected computer system with at least one Citizen user device, the first First Responder communications device running a First Responder computer program application which communicates data selected from the group consisting of multimedia service/MMS, Short Message Service/SMS, Uniform Resource Locator/URL, Live Video, Location information, voice communications, communication signals, and device control signals with the network connected computer;

providing a second First Responder communications device for communicating through the network connected computer system with the first First Responder communications device and the at least one Citizen user device, the second First Responder communications device running the First Responder computer program application which communicates data selected from the group consisting of multimedia service/MMS, Short Message Service/SMS, Uniform Resource Locator/URL, Live Video, Location information, voice communications, communication signals, and device control signals with the network connected computer;

configuring the first First Responder communications device to operate in a First Responder—Watch Commander Mode;

configuring the second First Responder communications device to operate in a First Responder—Field Agent Mode;

authenticating the use of the Watch Commander Mode set First Responder communications device to operate based on a predefined Watch Commander user profile;

authenticating the use of the Field Agent Mode set First Responder communications device to operate based on a predefined Field Agent user profile;

wherein the First Responder computer program application is functionally compatible with the Citizen computer program application;

a user of the at least one Citizen user device contacting and transmitting data to a Public Service Answering Point, the data selected from the group consisting of multimedia service/MMS, Short Message Service/SMS, Uniform Resource Locator/URL, Live Video, Location information, voice communications, communication signals, and device control signals;

the Public Service Answering Point receiving and transmitting data across the network between the Watch Commander Mode set communications device and the at least one Citizen user device;

the Watch Commander Mode set communications device further transmitting and receiving data across the network between the at least one Citizen user device and the Field Agent Mode set communications device;

wherein the Watch Commander Mode set communications device can remotely control the at least one Citizen user device by use of the data and device control signals exchanged between the devices, and wherein the Field Agent Mode set communications device can remotely control the at least one Citizen user device by use of the device control signals exchanged between the devices.

The emergency response communications method above can further include wherein the Watch Commander Mode set communications device selectively takes control of the at least one Citizen user device's features and its functions including: live video streaming, microphone use, speaker use, use of applications, installation or removal of applications, use of sensors, and access, reading, or writing of stored data.

The emergency response communications method above can further include wherein the Field Agent Mode set communications device selectively takes control of the at least one Citizen user device's features and its functions including: live video streaming, microphone use, speaker use, use of applications, installation or removal of applications, use of sensors, and access, reading, or writing of stored data.

The emergency response communications method above can further include wherein the Watch Commander Mode set communications device selectively enables or disables the features and functions of the at least one Citizen user device which the Citizen user can control.

The emergency response communications method above can further include wherein the Watch Commander Mode set communications device selectively enables or disables the features and functions of the at least one Citizen user device which the Field Agent Mode set communications device can control.

The emergency response communications method above can further include wherein the Field Agent Mode set communications device selectively enables or disables the features and functions of the at least one Citizen user device which the Citizen user can control.

The emergency response communications method above can further include wherein a list of accessible device resources of the at least one Citizen user device is provided to the first First Responder communications device and/or the second First Responder communications device.

In an exemplary, but not limiting usage of the above configuration, the 911 PSAP Contact Begins 2210 with a call from a Citizen involved in an emergency situation. The PSAP Call Taker decides whether or not to contact the Watch Commander (NO=2310, YES=2220). If the Watch Commander is contacted, he/she then determines whether to communicate directly with the Citizen, connect with a Field Agent or to patch a Field Agent in with the Citizen 2225. Once the Watch Commander is connected with the Citizen and/or Filed Agent, the Watch Commander has the option (YES=2235, NO=5A) of executing remote control of the device of the Field Agent or Citizen 2230. Remote control of the devices is moderated using a device profile which provides information such as user credentials, device features, and related control functions provided by data exchanged between the devices and device control data.

Whether or not the Watch Commander has remote control of the device of the Citizen and/or of the device of the Field Agent, the Watch Commander retains Two-Way communications with the Citizen and/or Field Agent during the incident 2240.

During the incident, the Watch Commander dynamically controls the resources of the device of the Citizen and/or of the device of the Field Agent 2245 dispatched to the incident.

Once the emergency incident is brought to resolution the communication links (such as the Two-Way communication and remote control functionality) between the Watch Commander, Citizen, and Field Agent are closed 2250 and the emergency response ends 2410.

In an alternate embodiment as shown in FIGS. 28-29 and in the functions presented above, the instant invention can be configured as emergency response communications method for exchanging information about an emergency situation, where the Watch Commander communicates with a Citizen, via his/her communication devices, and the Watch Commander also communicates with a variety of Emergency Response Team members via their communication devices. The Watch Commander can patch various team member in with the Citizen and also transfer or share control of the Citizens communication device with any selected team member.

As is also applicable to previous embodiments, each device which is linked-in with the Watch Commander provides information such as user authorization and device hardware/software information to the Watch Commander who then manages the use of the collection of resources.

The method of the instant embodiment being executed by a network connected computer system having a processor and machine-readable memory, the method comprising:

providing at least one Citizen user device running a Citizen computer program application which communicates data across the network connected computer selected from the group consisting of multimedia service/MMS, Short Message Service/SMS, Uniform Resource Locator/URL, Live Video, Location information, voice communications, communication signals, and device control signals with the network connected computer;

configuring the at least one Citizen user device to operate the Citizen computer program application including transmitting across the network connected computer information of the features, functions, sensors, and data remotely accessible on the device;

providing at least one First Responder communications device for communicating through the network connected computer system with at least one Citizen user device, the First Responder communications device running a computer program application which communicates data selected from the group consisting of multimedia service/MMS, Short Message Service/SMS, Uniform Resource Locator/URL, Live Video, Location information, voice communications, communication signals, and device control signals with the network connected computer;

executing a First Responder computer program application on the at least one First Responder communications device;

configuring the at least one First Responder communications device to operate the First Responder computer program application in a First Responder Watch Commander Mode;

wherein configuring the at least one First Responder communications device to operate the First Responder computer program application includes transmitting across the network connected computer system the features, functions, sensors, and data remotely accessible on the device;

authenticating, via the First Responder computer program application, the use of the Watch Commander Mode set First Responder communications device to operate based on a predefined Watch Commander user profile;

wherein the First Responder computer program application is functionally compatible with the Citizen computer program application;

contacting a Public Service Answering Point and transmitting data of a user of the at least one Citizen user device to the Public Service Answering Point, the data selected from the group consisting of multimedia service/MMS, Short Message Service/SMS, Uniform Resource Locator/URL, Live Video, Location information, voice communications, communication signals, and device control signals;

passing the data from the at least one Citizen user device from the Public Service Answering Point to the Watch Commander Mode set communications device through the network connected computer system;

wherein the Watch Commander Mode set communications device can remotely control the at least one Citizen user device by use of the data and device control signals exchanged between the devices, and wherein the Watch Commander Mode set communications device can remotely control other at least one First Responder user device by use of the data and device control signals exchanged between the devices.

The emergency response communications method above can further include wherein the at least one First Responder communications device can be configured to operate in a selected Specified First Responder Mode, the selectable Specified First Responder Modes including: First Responder Watch Commander, First Responder Field Agent, First Responder Fire Team Member, First Responder Medical Team Member, First Responder Hazardous Material Team Member, First Responder Bomb Squad Team Member, First Responder Crowd Management Team Member, First Responder Communications Team Member, First Responder Technical Support Team Member, and First Responder General Support Team Member.

The emergency response communications method above can further include wherein the Watch Commander Mode set communications device selectively takes control of the at least one Citizen user device's features and its functions including: live video streaming, microphone use, speaker use, use of applications, installation or removal of applications, use of sensors, and access, reading, or writing of stored data.

The emergency response communications method above can further include wherein the Watch Commander Mode set communications device selectively takes control of any of the other at least one First Responder communications device which is configured to operate in a Specified First Responder Mode, and wherein the Watch Commander Mode set communications device selectively controls any chosen Specified First Responder Mode set communications device's relevant features and functions including: live video streaming, microphone use, speaker use, use of applications, installation or removal of applications, use of sensors, and access, reading, or writing of stored data.

The emergency response communications method above can further include further including the First Responder computer program application authenticating the use of any at least one First Responder communications device which has been configured to operate in a Specified First Responder Mode operate based on a predefined Specified First Responder Mode user profile applicable to the selected Specified First Responder Mode.

The emergency response communications method above can further include wherein a list of accessible device resources of the at least one Citizen user device is provided to at least one First Responder communications device.

The foregoing disclosure is sufficient to enable one having skill in the art to practice the apparatus without undue experimentation, and provides the best mode of practicing the apparatus presently contemplated by the inventor. While there is provided herein a full and complete disclosure of the preferred embodiments of this apparatus, it is not intended to limit the apparatus to the exact construction, dimensional relationships, and operation shown and described. Various modifications, alternative constructions, changes and equivalents will readily occur to those skilled in the art and may be employed, as suitable, without departing from the true spirit and scope of the apparatus. Such changes might involve alternative materials, components, structural arrangements, sizes, shapes, forms, functions, operational features or the like. Elements of the instant apparatus may be made from a variety of known materials including wood, rubber, metal, or plastic, as well as from any suitable combination of appropriate materials.

It is understood the methods disclosed herein present the system and components which can form the apparatus for performing the methods as claimed and as disclosed. Further the use of the apparatus and system components presented herein can form the basis for the methods presented and claimed herein.

Accordingly, the proper scope of the present apparatus should be determined only by the broadest interpretation of the appended claims so as to encompass all such modifications as well as all relationships equivalent to those illustrated in the drawings and described in the specification.

The invention claimed is:

1. An emergency response communications method for exchanging information about an emergency situation, the method being executed by a network connected computer system having a processor and machine-readable memory, the method comprising:

providing at least one Citizen user device running a Citizen computer program application which communicates data selected from the group consisting of multimedia service/MMS, Short Message Service/SMS, Uniform Resource Locator/URL, Live Video, Location information, voice communications, communication signals, and device control signals with the network connected computer;

providing a first First Responder communications device for communicating through the network connected computer system with at least one Citizen user device, the first First Responder communications device running a First Responder computer program application which communicates data selected from the group consisting of multimedia service/MIMS, Short Message Service/SMS, Uniform Resource Locator/URL, Live Video, Location information, voice communications, communication signals, and device control signals with the network connected computer;

providing a second First Responder communications device for communicating through the network connected computer system with the first First Responder communications device and the at least one Citizen user device, the second First Responder communications device running the First Responder computer program application which communicates data selected from the group consisting of multimedia service/MMS, Short Message Service/SMS, Uniform Resource Locator/URL, Live Video, Location information, voice communications, communication signals, and device control signals with the network connected computer;
configuring the first First Responder communications device to operate in a First Responder—Watch Commander Mode;
configuring the second First Responder communications device to operate in a First Responder—Field Agent Mode;
authenticating the use of the Watch Commander Mode set First Responder communications device to operate based on a predefined Watch Commander user profile;
authenticating the use of the Field Agent Mode set First Responder communications device to operate based on a predefined Field Agent user profile;
wherein the First Responder computer program application is functionally compatible with the Citizen computer program application;
a user of the at least one Citizen user device contacting and transmitting data to a Public Service Answering Point, the data selected from the group consisting of multimedia service/MMS, Short Message Service/SMS, Uniform Resource Locator/URL, Live Video, Location information, voice communications, communication signals, and device control signals;
the Public Service Answering Point receiving and transmitting data across the network between the Watch Commander Mode set communications device and the at least one Citizen user device;
the Watch Commander Mode set communications device further transmitting and receiving data across the network between the at least one Citizen user device and the Field Agent Mode set communications device;
wherein the Watch Commander Mode set communications device can remotely control the at least one Citizen user device by use of the data and device control signals exchanged between the devices, and
wherein the Field Agent Mode set communications device can remotely control the at least one Citizen user device by use of the device control signals exchanged between the devices.

2. The emergency response communications method of claim 1, wherein the Watch Commander Mode set communications device selectively takes control of the at least one Citizen user device's features and its functions including: live video streaming, microphone use, speaker use, use of applications, installation or removal of applications, use of sensors, and access, reading, or writing of stored data.

3. The emergency response communications method of claim 1, wherein the Field Agent Mode set communications device selectively takes control of the at least one Citizen user device's features and its functions including: live video streaming, microphone use, speaker use, use of applications, installation or removal of applications, use of sensors, and access, reading, or writing of stored data.

4. The emergency response communications method of claim 1, wherein the Watch Commander Mode set communications device selectively enables or disables the features and functions of the at least one Citizen user device which the Citizen user can control.

5. The emergency response communications method of claim 1, wherein the Watch Commander Mode set communications device selectively enables or disables the features and functions of the at least one Citizen user device which the Field Agent Mode set communications device can control.

6. The emergency response communications method of claim 1, wherein the Field Agent Mode set communications device selectively enables or disables the features and functions of the at least one Citizen user device which the Citizen user can control.

7. The emergency response communication method of claim 1, wherein a list of accessible device resources of the at least one Citizen user device is provided to the first First Responder communications device and/or the second First Responder communications device.

8. An emergency response communications method for exchanging information about an emergency situation, the method being executed by a network connected computer system having a processor and machine-readable memory, the method comprising:
providing at least one Citizen user device running a Citizen computer program application which communicates data across the network connected computer selected from the group consisting of multimedia service/MMS, Short Message Service/SMS, Uniform Resource Locator/URL, Live Video, Location information, voice communications, communication signals, and device control signals with the network connected computer;
configuring the at least one Citizen user device to operate the Citizen computer program application including transmitting across the network connected computer information of the features, functions, sensors, and data remotely accessible on the device;
providing at least one First Responder communications device for communicating through the network connected computer system with at least one Citizen user device, the First Responder communications device running a computer program application which communicates data selected from the group consisting of multimedia service/MMS, Short Message Service/SMS, Uniform Resource Locator/URL, Live Video, Location information, voice communications, communication signals, and device control signals with the network connected computer;
executing a First Responder computer program application on the at least one First Responder communications device;
configuring the at least one First Responder communications device to operate the First Responder computer program application in a First Responder Watch Commander Mode;
wherein configuring the at least one First Responder communications device to operate the First Responder computer program application includes transmitting across the network connected computer system the features, functions, sensors, and data remotely accessible on the device;
authenticating, via the First Responder computer program application, the use of the Watch Commander Mode set First Responder communications device to operate based on a predefined Watch Commander user profile;
wherein the First Responder computer program application is functionally compatible with the Citizen computer program application;
contacting a Public Service Answering Point and transmitting data of a user of the at least one Citizen user device to the Public Service Answering Point, the data selected from the group consisting of multimedia service/MMS, Short Message Service/SMS, Uniform Resource Locator/URL, Live Video, Location information, voice communications, communication signals, and device control signals;

passing the data from the at least one Citizen user device from the Public Service Answering Point to the Watch Commander Mode set communications device through the network connected computer system;

wherein the Watch Commander Mode set communications device can remotely control the at least one Citizen user device by use of the data and device control signals exchanged between the devices, and wherein the Watch Commander Mode set communications device can remotely control other at least one First Responder user device by use of the data and device control signals exchanged between the devices.

9. The emergency response communications method of claim 8, wherein the at least one First Responder communications device can be configured to operate in a selected Specified First Responder Mode, the selectable Specified First Responder Modes including: First Responder Watch Commander, First Responder Field Agent, First Responder Fire Team Member, First Responder Medical Team Member, First Responder Hazardous Material Team Member, First Responder Bomb Squad Team Member, First Responder Crowd Management Team Member, First Responder Communications Team Member, First Responder Technical Support Team Member, and First Responder General Support Team Member.

10. The emergency response communications method of claim 9, wherein the Watch Commander Mode set communications device selectively takes control of the at least one Citizen user device's features and its functions including: live video streaming, microphone use, speaker use, use of applications, installation or removal of applications, use of sensors, and access, reading, or writing of stored data.

11. The emergency response communications method of claim 9, wherein the Watch Commander Mode set communications device selectively takes control of any of the other at least one First Responder communications device which is configured to operate in a Specified First Responder Mode, and wherein the Watch Commander Mode set communications device selectively controls any chosen Specified First Responder Mode set communications device's relevant features and functions including: live video streaming, microphone use, speaker use, use of applications, installation or removal of applications, use of sensors, and access, reading, or writing of stored data.

12. The emergency response communications method of claim 9, further including the First Responder computer program application authenticating the use of any at least one First Responder communications device which has been configured to operate in a Specified First Responder Mode operate based on a predefined Specified First Responder Mode user profile applicable to the selected Specified First Responder Mode.

13. The emergency response communications method of claim 8, wherein a list of accessible device resources of the at least one Citizen user device is provided to at least one First Responder.

* * * * *